United States Patent
Le Floch

(10) Patent No.: US 7,386,146 B2
(45) Date of Patent: Jun. 10, 2008

(54) INSERTION OF A MESSAGE IN A SEQUENCE OF DIGITAL IMAGES

(75) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 10/235,803

(22) Filed: Sep. 6, 2002

(65) Prior Publication Data

US 2003/0053657 A1    Mar. 20, 2003

(30) Foreign Application Priority Data

Sep. 13, 2001 (FR) .................... 01 11858
Oct. 19, 2001 (FR) .................... 01 13511
Oct. 19, 2001 (FR) .................... 01 13512
Oct. 19, 2001 (FR) .................... 01 13513

(51) Int. Cl.
*G06K 9/00* (2006.01)
*G06K 15/00* (2006.01)

(52) U.S. Cl. ..................... 382/100; 358/3.28
(58) Field of Classification Search ............ None
See application file for complete search history.

(56) References Cited

U.S. PATENT DOCUMENTS

| | | | |
|---|---|---|---|
| 5,809,139 A | 9/1998 | Girod et al. ............ 380/5 |
| 5,933,798 A | 8/1999 | Linnartz ................. 702/191 |
| 5,991,426 A * | 11/1999 | Cox et al. .............. 382/100 |
| 6,005,643 A * | 12/1999 | Morimoto et al. ..... 375/240.26 |
| 6,061,793 A | 5/2000 | Tewfik et al. ........... 713/176 |
| 6,094,483 A | 7/2000 | Fridrich et al. ......... 380/28 |
| 6,128,411 A * | 10/2000 | Knox ..................... 382/232 |
| 6,282,299 B1* | 8/2001 | Tewfik et al. ........... 382/100 |
| 6,373,974 B2* | 4/2002 | Zeng ...................... 382/135 |
| 6,614,914 B1* | 9/2003 | Rhoads et al. .......... 382/100 |
| 6,700,989 B1* | 3/2004 | Itoh et al. ............... 382/100 |
| 2001/0016058 A1* | 8/2001 | Zeng ...................... 382/135 |
| 2002/0027612 A1* | 3/2002 | Brill et al. .............. 348/473 |
| 2002/0094082 A1* | 7/2002 | Jones et al. ............. 380/219 |
| 2002/0172429 A1* | 11/2002 | Boliek et al. ........... 382/240 |
| 2003/0068067 A1* | 4/2003 | Fielding et al. ........ 382/100 |

(Continued)

FOREIGN PATENT DOCUMENTS

EP    0 828 372 A2    3/1998

(Continued)

OTHER PUBLICATIONS

Chu et al: "Luminance Channel Modulated Watermarking of Digital Images" Proceedings of SPIE, SPIE, Bellingham, VA, vol. 3723, Apr. 1999, pp. 437-445.

(Continued)

*Primary Examiner*—Bhavesh M. Mehta
*Assistant Examiner*—Charles Kim
(74) *Attorney, Agent, or Firm*—Fitzpatrick, Cella, Harper & Scinto

(57) ABSTRACT

The invention relates to a method of inserting a message in a sequence of digital images, characterized in that it comprises the insertion (S4), in the spatial domain, of at least one symbol of the message in at least one part of an image ($I_n$), said image being bounded between two images in which no symbol is inserted in their respective parts in spatial correspondence with said part.

63 Claims, 24 Drawing Sheets

U.S. PATENT DOCUMENTS

2003/0165253 A1* 9/2003 Simpson et al. ............ 382/100

FOREIGN PATENT DOCUMENTS

| EP | 0 899 688 A2 | 3/1999 |
| EP | 1 079 633 A2 | 2/2001 |
| GB | 2 325 765 | 12/1998 |
| WO | WO 99/18723 | 4/1999 |
| WO | WO 99/45704 | 9/1999 |

OTHER PUBLICATIONS

Tsang et al: "Robust and High Quality Video Watermarking With the Use of Temporal Redundancy" Proceedings of SPIE, SPIE, Bellingham, VA, No. 4314, Jan. 22, 2001, pp. 55-63.

Mobasseri et al: "Content-Dependent Video Authentication by Self-Watermarking in Color Space" Proceedings of the SPIE, SPIE, Bellingham, VA, No. 4314, Jan. 22, 2001, pp. 35-44.

Martin Kutter et al: "Digital Watermarking of Color Images Using Amplitude Modulation" Journal of Electronic Imaging, SPIE, vol. 2, No. 7, Apr. 1998, pp. 326-332.

Tae-Yun Chung et al: "Digital Watermarking for Copyright Protection of MPEG2" 1998 International Conference on Consumer Electronics, vol. 44, Jun. 1998, IEEE, pp. 336-337.

Bijan G. Mobasseri: "Direct Sequence Watermarking of Digital Video Using M- Frames" ICIP 98, Proceedings of 1998 International Conference on Image Processing, IEEE Computer Society, Oct. 1998, pp. 399-403.

Ron G. Van Schyndel et al: "Algebraic Construction of a New Class of Quasi-Orthogonal Arrays in Steganography" Proceedings of the SPIE vol. 3657, SPIE, Bellingham, VA Jan. 1999, pp. 354-358.

R. Caldelli, et al., "A Robust Frame-Based Technique for Video Watermarking," European Signal Processing Conference (Eusipco) 2000, Tampere, Finland, Sep. 2000.

Frank Hartung, et al., "Digital Watermarking of Raw and Compressed Video," SPIE, Digital Compression Technologies and Systems for Video Communication, Berlin, pp. 205-213, Oct. 1996.

Patrick Bas et al: "A Geometrical and Frequential Watermarking Scheme Using Similarities" Proceedings of the SPIE vol. 3657, SPIE, Bellingham, WA, Jan. 1999, pp. 264-272.

Brian Chen et al: "Dither Modulation: A New Approach to Digital Watermarking and Information Embedding" Proceedings of the SPIE, vol. 3657, SPIE, Bellingham, WA, Jan. 1999, pp. 342-353.

Herve Le Floch: "Irregular Sampling and Interpolation: Application has the Representation of Fixed Images and Animees," Thesis, Dec. 8, 1997.

* cited by examiner

INSERTION OF A MESSAGE IN A SEQUENCE OF DIGITAL IMAGES

BACKGROUND OF THE INVENTION

1. Field of the Invention

The present invention relates to a method of inserting supplementary information such as a secret mark in a digital signal.

It also concerns a method of extracting a secret mark inserted in a digital signal.

Correlatively, the present invention concerns a device for inserting supplementary information and a device for extracting supplementary information, adapted respectively to implement the insertion and extraction methods according to the invention.

2. Description of the Related Art

The digital signal considered hereinafter will more particularly be a sequence of digital images.

The insertion and extraction methods according to the invention lie within the technical field of the watermarking of digital data, which can be interpreted as the insertion of a seal in the digital data, making it possible for example to authenticate the content of a digital data file. This watermarking is also referred to as digital tattooing.

Watermarking entails in general terms the modification of coefficients representing the digital image. This modification is imperceptible to the eye, but can be decoded by an appropriate decoder.

Conventionally, to insert a binary message into a digital image, the bits of the message are first of all modulated by a noise sequence little correlated with the image. The noise sequence is a pseudo-random signal. This modulated message is next weighted so that it remains invisible after insertion in the image.

For the later extraction of the message, the same noise sequence is re-used. This noise sequence is correlated with the difference between the image in which the message has been inserted and an estimation of the initial image. This calculation makes it possible to recover the value of each bit inserted, and all the better with the estimation of the initial image being correct.

The document U.S. Pat. No. 5,933,798 proposes to improve the detection of a message inserted in a video signal by filtering the signal in which that message has been inserted. This filtering is spatial filtering, or in other words an intra-image prediction. The time dimension of the signal is not used.

The document U.S. Pat. No. 5,991,426 relates to the insertion of a message in video images. Such an image comprises an even field and an odd field which are strongly correlated. The insertion takes this into account for inserting the message in a particular manner in order to reduce the noise due to the image on extraction of the message.

The article entitled "A robust frame-based technique for video watermarking" by R. Caldelli, M. Barni, F. Bartolini and A. Piva, which appeared in Eusipco 2000, describes an algorithm for message insertion in a video. One image out of X images is used, where X is any integer, the value 9 being often used. The fact of not using all the images makes it possible to increase the statistical invisibility and the message is more difficult to predict. Prior to the insertion, the images are transformed by a discrete Fourier transformation. The extraction of the message is carried out by correlation measurement through individually processing each image of the video.

3. Brief Summary of the Invention

In the preceding examples the time dimension of the signal is not used.

In a first aspect, the object of the present invention is to improve the estimation of the initial image on the extraction of a message in such a manner as to increase the quality of the extraction of the message.

For this, the invention provides a method and a device for insertion of a message in a sequence of digital images which use the time dimension of the image sequence.

More particularly, the invention provides a method of inserting a message in a sequence of digital images, characterized in that it comprises the insertion, in the spatial domain, of at least one symbol of the message in at least one part of an image, said image being bounded between two images in which no symbol is inserted in their respective parts in spatial correspondence with said part.

Correlatively, the invention relates to a device for inserting a message in a sequence of digital images, characterized in that it comprises means for inserting, in the spatial domain, at least one symbol of the message in at least one part of an image, said image being included between two images in which no symbol is inserted in their respective parts in spatial correspondence with said part.

The invention makes it possible, on the later extraction of a message, to improve the estimation of the initial image and so favor the correct prediction of the message. Indeed, the zones in which message symbols are inserted are always bounded temporally by zones in which no insertion is made.

According to a preferred feature, the insertion is carried out on one image out of every two. This implementation is particularly simple, since a symbol can be inserted over the entirety of an image, this image being bounded by two images in which no insertion has been carried out. This implementation is simple and gives satisfactory results.

The insertion device comprises means for implementing the above features.

According to a preferred feature, the invention comprises the modulation of a symbol to be inserted by a pseudo-random sequence and the insertion of the result in said at least one part of an image.

The invention also relates to a method of extracting a message from a sequence of images in which the message has been inserted by the method of insertion already set out, characterized in that it comprises, for an image part in which at least one symbol has been inserted, the steps of:

predicting the current image part from the respective parts in spatial correspondence of the two images bounding it, subtracting the part of the image predicted from the part of the image in which at least one symbol has been inserted, and extracting the at least one symbol from the result of the subtraction.

The prediction makes it possible to obtain an estimation of the image which is close to the initial image, which enables a good quality of detection and of extraction of the message.

According to a preferred feature, the prediction of the current image part is performed by a calculation of the mean of the respective parts in spatial correspondence of the two images bounding it or by a calculation of the movement between the current image part and the respective parts in spatial correspondence of the two images bounding it.

According to a preferred feature, at the time of the subtraction, only the values resulting from the subtraction which are less than a predetermined threshold are kept. This is because this enables the extreme values to be eliminated which contributes to correct extraction of the message.

According to a preferred feature, the extraction comprises a calculation of correlation between the result of the subtraction and the pseudo-random sequence used at the time of the insertion.

The insertion of a message is said to be robust if the message can later be extracted even if the image has undergone transformations such as compression and/or geometrical distortions and/or time truncation and/or modification of a component of the pixels of the image, for example modification of the luminance. The term time truncation is used herein to mean the deletion of images at the start or at the end of the video sequence.

In order to establish the ideas, FIG. 24 represents a sequence of digital images VD. All the images of the sequence have the same size of H×L pixels, where H and L are integers.

The sequence VD is transformed into the sequence VD1, of which the images all have a size of H'×L' pixels, where H' is less than H and L' is less than L. In other words, only one part of each original image is kept.

The sequence VD is transformed into the sequence VD2 by interpolation, of which the images represent the same content as the original images, but with different dimensions: H"×L" pixels.

For example, the document U.S. Pat. No. 5,809,139 describes the insertion of a message in a video sequence. The message is inserted by modulation of each of its bits by a pseudo-random sequence.

A geometrical modification of the images of the video after insertion leads to a loss in the synchronization with the demodulation sequence. It then becomes impossible to extract the message.

The article entitled "A geometrical and frequential watermarking scheme using similarities" of P. Bas, J. M. Chassery and F. Davoine which appeared in SPIE conference on security and watermarking of multimedia contents, San Jose, Calif., Vol. 3657, January 1999, deals with watermarking of fixed images.

In this document, characteristic points of the image are detected. Square blocks are formed around these points. The image is watermarked by adding to one of the other blocks the texture of the block in which the detected point is to be found.

The watermarking signal is thus created from the image. However, this technique does not enable a message to be inserted in the image. Moreover, this watermarking is not robust in relation to numerous geometrical modifications of the image following watermarking.

The techniques presented in these two documents do not vary and are consequently robust with respect to the changes of a component of the pixels of the image. On the other hand, as already stated, they are not robust with respect to geometrical modifications.

The article entitled "Dither modulation : a new approach to digital watermarking and information embedding" by B. Chen and G. W. Wornell, which appeared in SPIE conference on security and watermarking of multimedia contents, San Jose, Calif., Vol. 3657, January 1999, deals with a method of watermarking of an image based on a uniform quantization of the pixels of the image. The quantization mode is chosen as a function of the value of the bit that it is desired to insert in the image.

This technique is robust to geometrical modifications of the image following watermarking. However, the inventor has determined by means of tests that this technique is less robust than the present invention to MPEG (Motion Picture Expert Group) compression.

Furthermore, this technique is not robust with respect to changes in the components of the pixels of the image, such as modification of the luminance value.

In the case of a time truncation of the digital sequence of images in which a message has been inserted, that is to say images have been deleted in particular at the start of the sequence, the message which is later extracted from the sequence is offset with respect to the message which had been inserted. It is thus necessary to perform a time re-synchronization of the extracted message.

The three prior documents do not deal with this problem.

The document entitled "A robust Frame-Based Technique for video watermarking" which appeared at Eucipco, Tampere, Finland, in September 2000, presents an algorithm for video watermarking which is robust to certain geometric distortions. Generally, one image out of every twelve is watermarked. On account of this, it is important to find the watermarked images again when a time truncation appears. To do this, a correlation measurement is calculated between each image of the video and a reference watermarking signal, which is done even if the majority of the images are not watermarked. The video is considered to be watermarked if images of the video present a correlation peak greater than a threshold. The time localization of these peaks is of little importance; only their presence shows the presence of the watermarking searched for. This algorithm does not therefore require any time synchronization and consequently does not deal with this question.

Furthermore, in this document, only the reference watermarking signal is searched for. This algorithm is thus difficult to implement when the number of possible messages is very high. Indeed, if the number of watermarks searched for is high, for example 2^64, then 2^64 correlation measurements must be carried out. This number is too high to be able to be implemented in practice.

In the document entitled "Digital watermarking of raw and compressed video" by F. Hartung and B. Girod which appeared in SPIE, Digital Compression Technologies and Systems For video Communication, October 1996, Berlin, a method of watermarking by spectrum spreading is presented. In case of time truncation, the authors mention a mechanism based on a "sliding correlator" to recover the time synchronization.

However, this document does not deal with the question of geometrical distortions. The synchronization presented in this document is ineffective when the time truncation is associated with a geometrical distortion.

Thus, none of the prior documents presents a technique for message insertion which is both robust to geometrical distortions as well as enabling a time re-synchronization to be carried out on the extraction of the message so as to eliminate the effect of a time truncation.

In a second aspect, the object of the present invention is to remedy the drawbacks of the prior art, by providing a method and device for inserting a message in a sequence of digital images which is robust with respect to geometrical modifications and to the operations of compression and decompression.

To this end, the invention provides a method of inserting a message in a sequence of digital images, characterized in that it comprises, for each image in which a symbol of the message is to be inserted, the steps of:

determining a modulation sequence from a reference image included in the sequence of images, modulating the symbol to be inserted by the determined modulation sequence, inserting the modulated symbol in the current image.

The invention permits an insertion that is robust to geometrical distortions and to compression and decompression operations.

According to a preferred feature, the reference image is the image following the current image in the sequence. This feature is simple to implement.

According to a preferred feature, the insertion is carried out in one image out of every two. This implementation is particularly simple, since a symbol can be inserted over the entirety of an image, this image being bounded by two images in which no insertion has been carried out. This implementation is simple and gives satisfactory results.

According to a preferred feature, the determination of a modulation sequence comprises:

performing integer division of the value of a predetermined component of each pixel of the reference image, by a first predetermined value, comparing the remainder of the integer division with a predetermined value, for each integer division, determining the value of each coefficient of the modulation sequence, depending on the respective result of each comparison.

The invention also relates to a method of extracting a message from a sequence of images in which the message has been inserted by the method of insertion already set out, characterized in that it comprises, for an image in which a symbol has been inserted, the steps of:

estimating the watermarking signal of the inserted symbol, determining a demodulation sequence from a reference image, demodulating the estimated watermarking signal with the demodulation sequence.

According to a preferred feature, the estimation of the watermarking signal of the inserted symbol comprises the steps of:

time prediction of a current image from the two images bounding it, and subtraction of the predicted image from the current image.

According to a preferred feature, the prediction of the current image is performed by a calculation of the mean of the two images bounding it.

In a complementary manner, the invention relates to a device for the insertion of a message in a sequence of digital images, characterized in that is comprises:

means for determining a modulation sequence from a reference image included in the sequence of images, for each image in which a symbol of the message is to be inserted, means for modulating the symbol to be inserted by the determined modulation sequence, means for inserting the modulated symbol in the current image.

The insertion device comprises means for implementing the above features.

The invention also relates to a device for extracting a message from a sequence of images in which the message has been inserted by the insertion device already presented, characterized in that it comprises:

means for time prediction of a current image from the two images bounding it, and means for subtraction of the predicted image from the current image, means for determining a demodulation sequence from a reference image, means for demodulation of the result of the subtraction by the demodulation sequence.

In a third aspect, the object of the present invention is to remedy the drawbacks of the prior art, by providing a method and device for inserting a message in a sequence of digital images, which, whilst being robust to geometrical modifications and to the operations of compression and decompression, can be time re-synchronized on its extraction.

To this end, the invention provides a method of inserting a message in a sequence of images, the message comprising ordered symbols, characterized in that it comprises, for each image in which a symbol of the message is to be inserted, the steps of:

determining a first modulation sequence from a reference image included in the sequence of images, according to a first law, if the order of the symbol is different to a predetermined order, determining a second modulation sequence from a reference image included in the sequence of images, according to a second law, if the order of the symbol is equal to the predetermined order, modulating the symbol to be inserted by the determined modulation sequence, inserting the modulated symbol in the current image.

In a complementary manner, the invention relates to a device for the insertion of a message in a sequence of images, the message comprising ordered symbols, characterized in that is comprises:

means for determining, for each image in which a symbol of the message is to be inserted, a first modulation sequence from a reference image included in the sequence of images, according to a first law, if the order of the symbol is different to a predetermined order, means for determining a second modulation sequence from a reference image included in the sequence of images, according to a second law, if the order of the symbol is equal to the predetermined order, means for modulating the symbol to be inserted by the determined modulation sequence, means for inserting the modulated symbol in the current image.

The invention permits an insertion that is robust to geometrical distortions and to compression and decompression operations. Furthermore, in the case of a time truncation of the video sequence in which a message has been inserted, the invention makes it possible to re-synchronize this message on its extraction.

According to a preferred feature, the first and second sequences are such that the result of the correlation of the first sequence by the second sequence is negligible in relation to the result of the correlation of the first sequence by itself or of the second sequence by itself.

Thus it is possible to differentiate the symbols of the message which have been inserted using the first law from those which have been inserted using the second law.

According to a preferred feature, the reference image is the image following the current image in the sequence. This feature is simple to implement.

According to a preferred feature, the insertion is carried out in one image out of every two. This implementation is particularly simple, since a symbol can be inserted over the entirety of an image, this image being bounded by two images in which no insertion has been carried out. This implementation is simple and gives satisfactory results.

According to a preferred feature, the determination of a modulation sequence comprises:

performing integer division of a quantity dependent on the value of a predetermined component of each pixel of the reference image, by a first predetermined value, comparing the remainder of the integer division with a second predetermined value, for each integer division, determining the value of each coefficient of the modulation sequence, depending on the respective result of each comparison.

According to a preferred feature, the predetermined order is that of the first symbol of the message. This is because it is particularly worthwhile to find the start of the message which has been inserted in the video sequence.

The invention also relates to a method of extracting a message from a sequence of images in which the message has been inserted by the method of insertion already set out, characterized in that it comprises the steps of:

detecting the images in which the symbol of predetermined order has been inserted, among the images in which a message symbol has been inserted, extracting the inserted message.

The message which is extracted is thus time re-synchronized, since the images in which the symbol of predetermined order has been inserted have been identified.

According to a preferred feature, the method of extraction further comprises the prior step of detecting the images in which a message symbol has been inserted.

This prior step makes it possible to simplify the search for the images in which the symbol of predetermined order has been inserted.

According to a preferred feature, the detection of the images in which the symbol of predetermined order has been inserted comprises, for an image in which a symbol has been inserted, estimating the watermarking signal of the inserted symbol, determining a demodulation sequence from a reference image, according to the second law, measuring a correlation between the estimated watermarking signal and the demodulation sequence, determining the images for which the correlation measurement is maximum.

The calculated correlation measurements are maximum for the images in which the symbol of predetermined order has been inserted, which enables these images to be identified.

According to a preferred feature, the detection of the images in which a symbol has been inserted comprises, for an image:

estimating the watermarking signal of the inserted symbol, determining a demodulation sequence from a reference image, according to the first law, measuring a correlation between the estimated watermarking signal and the demodulation sequence, determining the images for which the correlation measurement is maximum.

The calculated correlation measurements are maximum for the images in which a symbol has been inserted, which enables these images to be identified.

According to a preferred feature, the method of extraction comprises, for an image in which a symbol has been inserted, the steps of:

estimating the watermarking signal of the inserted symbol, determining a demodulation sequence from a reference image, according to a first or second law, depending on the order of the symbol, demodulating the estimated watermarking signal with the demodulation sequence.

The choice of the first or the second law is carried out depending on the knowledge of the images in which the symbol of predetermined order has been inserted.

The invention also relates to a device for extracting a message from a sequence of images in which the message has been inserted by the insertion device already presented, characterized in that it comprises:

means for detecting the images in which the symbol of predetermined order has been inserted, among the images in which a message symbol has been inserted, means for extracting the inserted message.

According to a preferred feature, the extraction device further comprises prior means for detecting the images in which a message symbol has been inserted.

In a fourth aspect, the object of the present invention is to remedy the drawbacks of the prior art, by providing a method and device for inserting a message in a sequence of digital images, which, whilst being robust to geometrical modifications and to the operations of compression and decompression, also makes it possible to extract the message inserted when the sequence of images in which the message was inserted has undergone a modification of a component of the value of the pixels.

To this end, the invention provides a method of inserting a message in a sequence of images, the images comprising pixels represented by components, characterized in that it comprises, for each image in which a symbol of the message is to be inserted, the steps of:

determining a modulation sequence from a reference image included in the sequence of images, according to a periodic law of predetermined period, said law being such that the absolute value of a correlation measurement of the modulation sequence with a second modulation sequence determined according to the same law and from the same reference image in which the values of a predetermined component of the pixels have been modified, has only one maximum over the predetermined period, modulating the symbol to be inserted by the determined modulation sequence, inserting the modulated symbol in the current image.

The invention enables insertion to be achieved that is robust in relation to geometric distortions and operations of compression and decompression, while also enabling the extraction of the inserted message when the sequence of images in which the message was inserted has undergone a modification of a component of the value of the pixels.

According to a preferred feature, the reference image is the image following the current image in the sequence. This feature is simple to implement.

According to a preferred feature, the insertion is carried out in one image out of every two. This implementation is particularly simple, since a symbol can be inserted over the entirety of an image, this image being bounded by two images in which no insertion has been carried out. This implementation is simple and gives satisfactory results.

According to a preferred feature, the determination of a modulation sequence comprises:

performing integer division of the value of a predetermined component of each pixel of the reference image, by a first predetermined value, comparing the remainder of the integer division with a set of second predetermined values, for each integer division, determining the value of each coefficient of the modulation sequence, depending on the respective result of each comparison.

According to a preferred feature, the predetermined component is the luminance.

The invention also relates to a method of extracting a message from a sequence of images in which the message has been inserted by the method of insertion already set out, characterized in that it comprises the steps of:

estimating a modification of the values of the predetermined component of the pixels of the reference image, for each image in which a symbol has been inserted, compensating for the estimated modification, for each image in which a symbol has been inserted, extracting the inserted message.

According to a preferred feature, the estimation of a modification of the values of the predetermined component of the pixels of the reference image comprises:

estimating the watermarking signal of the inserted symbol, determining a demodulation sequence from a reference image in which the values of the predetermined component of the pixels have been modified, measuring a correlation between the estimated watermarking signal and the demodulation sequence, determining a modification value for which the correlation measurement is maximum.

According to a preferred feature, the compensation comprises adding the estimated modification to the value of the predetermined component of each pixel of the reference image.

According to a preferred feature, the extraction comprises, for an image in which a symbol has been inserted, the steps of:

estimating the watermarking signal of the inserted symbol, determining a demodulation sequence from a reference image, in which the values of the predetermined component of the pixels have been modified by the estimated modification, demodulating the estimated watermarking signal with the demodulation sequence.

In a complementary manner, the invention relates to a device for the insertion of a message in a sequence of images, the images comprising pixels represented by components, characterized in that is comprises:

means for determining, for each image in which a message symbol is to be inserted, a modulation sequence from a reference image included in the sequence of images, according to a periodic law of predetermined period, said law being such that the absolute value of a correlation measurement of the modulation sequence with a second modulation sequence determined according to the same law and from the same reference image in which the values of a predetermined component of the pixels have been modified, has only one maximum over the predetermined period, means for modulating the symbol to be inserted by the determined modulation sequence, means for inserting the modulated symbol in the current image.

The invention also concerns an extraction device which comprises means for implementing the above characteristics.

The insertion device and the extraction method and device have similar advantages to those already set out.

The invention also relates to a digital device including the device according to the invention, or means for implementing the method according to the invention. This digital apparatus is for example a digital camera, a digital camcorder, a scanner, a printer, a photocopier, or a fax machine. The advantages of the device and of the digital device are identical to those already set out.

The invention also concerns an information storage means, which can be read by a computer or microprocessor, integrated or not into the device, and possibly removable, stores a program implementing the method according to the invention.

The invention also concerns a computer program readable by a microprocessor and comprising one or more sequences of instructions is capable of implementing the methods according to the invention.

BRIEF DESCRIPTION OF THE DRAWINGS

The characteristics and advantages of the present invention will appear more clearly from a reading of a preferred embodiment illustrated by the accompanying drawings, in which.

DETAILED DESCRIPTION OF THE INVENTION

Figure 1:
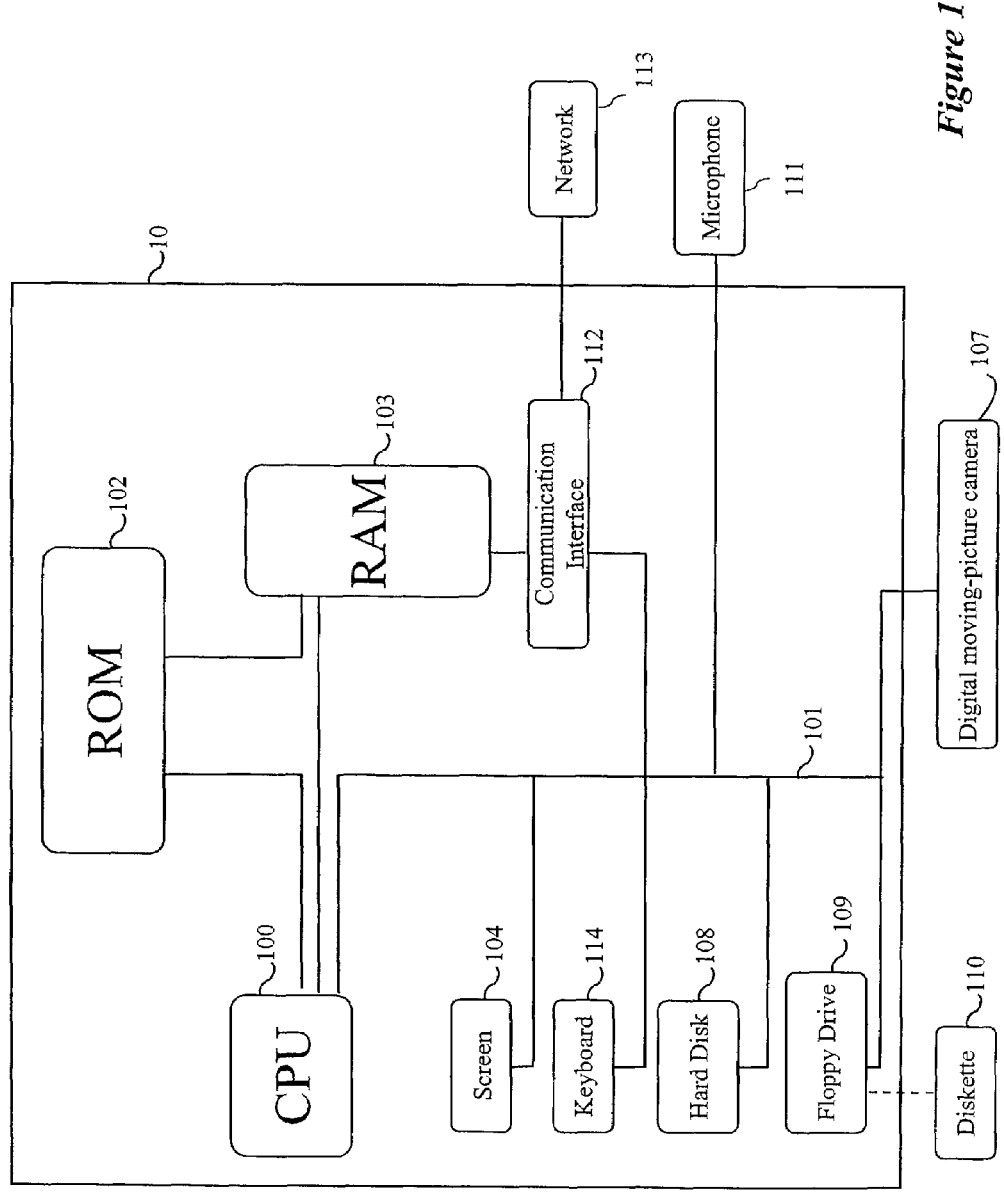
FIG. 1 is an embodiment of a device implementing the invention.

According to the chosen embodiment shown in FIG. 1, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may be a diskette, a CD-ROM, or a DVD-ROM, for example. The disk 110, like the disk 108, can contain data processed according to the invention as well as the program or programs implementing the invention which, once read by the device 10, will be stored on the hard disk 108. According to a variant, the program enabling the device to implement the invention can be stored in a read-only memory 102 (referred to as ROM in the drawing). In a second variant, the program can be received in order to be stored in an identical fashion to that described previously via the communication network 113.

The device 10 is connected to a microphone 111. The data to be processed according to the invention will in this case consist of audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and possibly removable, stores a program implementing respectively the insertion method and extraction method according to the invention.

The communication bus 101 affords communication between the different elements included in the microcomputer 10 or connected to it. The representation of the bus 101 is not limiting and, in particular, the central processing unit 100 is liable to communicate instructions to any component of the microcomputer 10 directly or by means of another element of the microcomputer 10.

Figure 2:
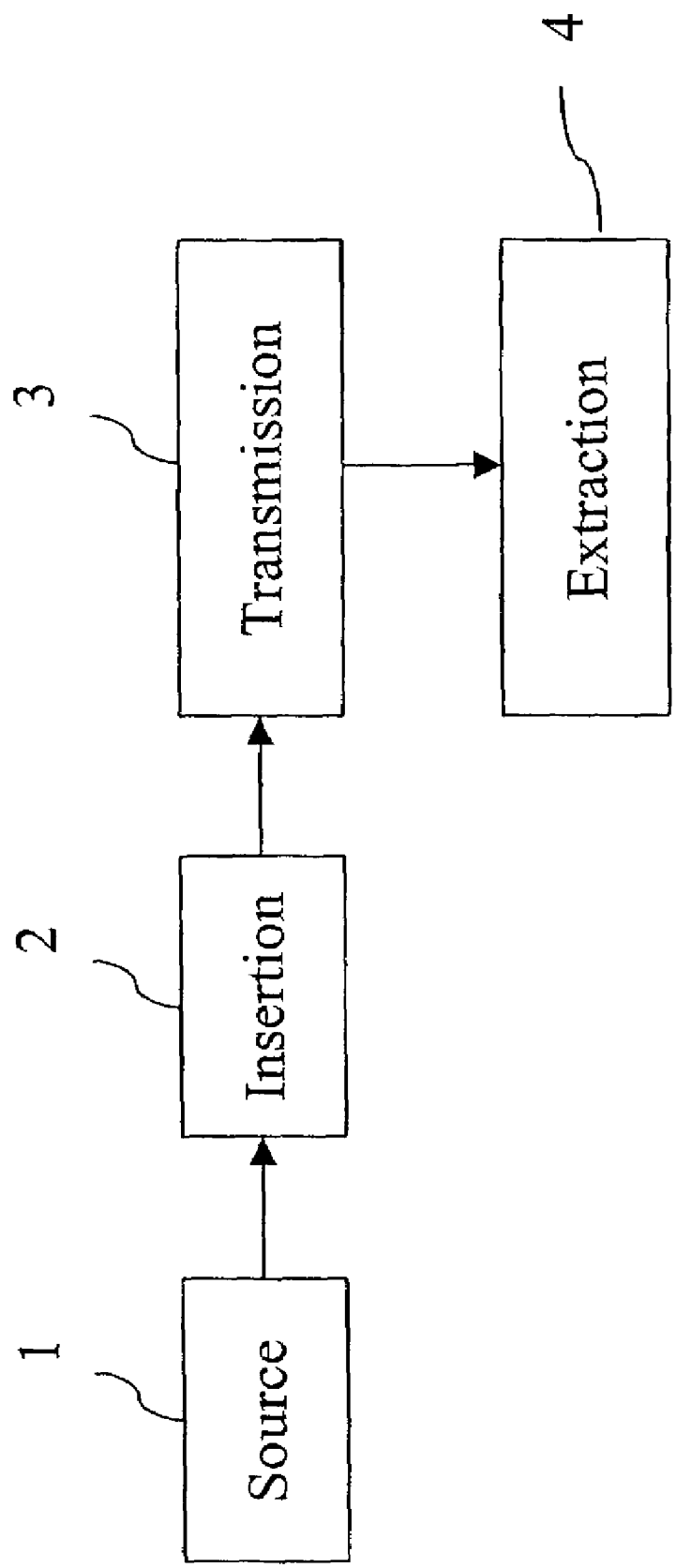
FIG. 2 represents a device according to the invention.

With reference to FIG. 2, an embodiment of the insertion device according to the invention is adapted to insert a message in a sequence of digital images without modifying the visual quality of the sequence of images. The watermarking device is integrated into a device, which is for example a digital camera, a digital camcorder, a scanner, a printer, a photocopier, a fax machine, a system of database management, or a computer.

The device according to the first aspect of the invention comprises means for inserting, in the spatial domain, at least one symbol of the message in at least one part of an image, said image being bounded between two images in which no symbol is inserted in their respective parts in spatial correspondence with said part.

The device according to the second aspect of the invention comprises:
  means for determining a modulation sequence from a reference image included in the sequence of images, for each image in which a symbol of the message is to be inserted,
  means for modulating the symbol to be inserted by the determined modulation sequence,
  means for inserting the modulated symbol in the current image.

The insertion device according to the third aspect of the invention comprises:
  means for determining, for each image in which a symbol of the message is to be inserted, a first modulation sequence from a reference image included in the sequence of images, according to a first law, if the order of the symbol is different to a predetermined order,
  means for determining a second modulation sequence from a reference image included in the sequence of images, according to a second law, if the order of the symbol is equal to the predetermined order,
  means for modulating the symbol to be inserted by the determined modulation sequence,
  means for inserting the modulated symbol in the current image.

The insertion device according to the fourth aspect of the invention comprises:
  means for determining, for each image in which a message symbol is to be inserted, a modulation sequence from a reference image included in the sequence of images, according to a periodic law of predetermined period,
  said law being such that the absolute value of a correlation measurement of the modulation sequence with a second modulation sequence determined according to the same law and from the same reference image in which the values of a predetermined component of the pixels have been modified, has only one maximum over the predetermined period,
  means for modulating the symbol to be inserted by the determined modulation sequence, means for inserting the modulated symbol in the current image.

An image source 1 supplies a sequence of digital images to the insertion device 2, of which the operation will be detailed below using an algorithm.

The insertion device supplies a sequence of images in which a message has been inserted to transmission and/or memory storage means 3. These means are conventional and will not be described here.

The means 3 are connected to an extraction device 4 according to the invention.

According to the first aspect of the invention, the extraction device comprises for an image part in which at least one symbol has been inserted:
- means for predicting the current image part from the respective parts in spatial correspondence of the two images bounding it,
- means for subtracting the part of the image predicted from the part of the image in which at least one symbol has been inserted, and
- means for extracting the at least one symbol from the result of the subtraction.

According to the second aspect of the invention, the extraction device comprises:
- means for time prediction of a current image from the two images bounding it,
- means for subtraction of the predicted image from the current image,
- means for determining a demodulation sequence from a reference image,
- means for demodulation of the result of the subtraction by the demodulation sequence.

According to the third aspect of the invention, the extraction device comprises:
- means for detecting the images in which the symbol of predetermined order has been inserted, among the images in which a message symbol has been inserted,
- means for extracting the inserted message.

Furthermore, the extraction device according to the third aspect of the invention comprises prior means for detecting the images in which a message symbol has been inserted.

According to the fourth aspect of the invention, the extraction device comprises:
- means for estimating a modification of the values of the predetermined component of the pixels of the reference image, for each image in which a symbol has been inserted,
- means for compensating for the estimated modification, for each image in which a symbol has been inserted,
- means for extracting the inserted message.

The functioning of the extraction device will be detailed hereinafter using an algorithm.

Figure 3:
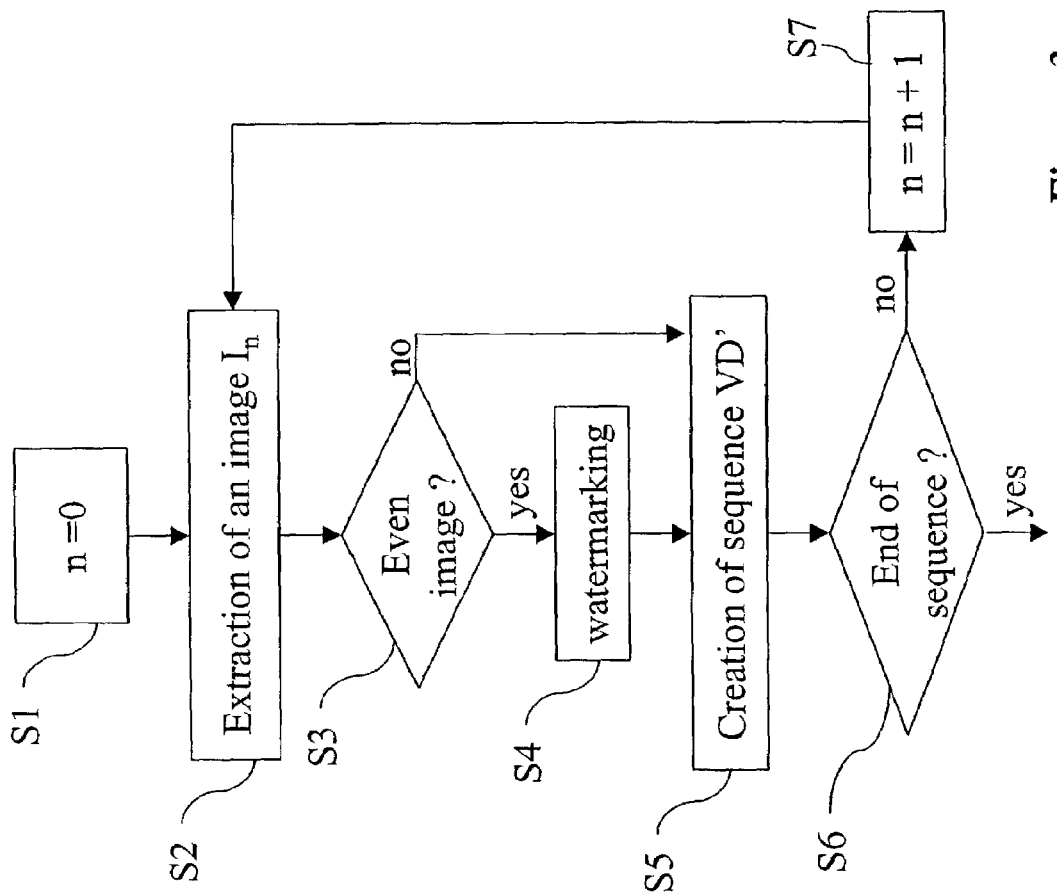
FIG. 3 is an embodiment of a method of message insertion in a sequence of images according to the first aspect of the invention.

FIG. 3 shows an embodiment of a method of watermarking a sequence of images according to the first aspect of the invention. The sequence of images VD comprises images $I_0$ to $I_N$. This method is implemented in the insertion device and comprises the steps S1 to S7.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S1 is the setting to zero of a parameter n. The parameter n takes integer values between 0 and N, which represent the index of the current image.

The following step S2 is the extraction of an image $I_n$ of the sequence. The images are extracted successively from the first to the last.

Figure 4:
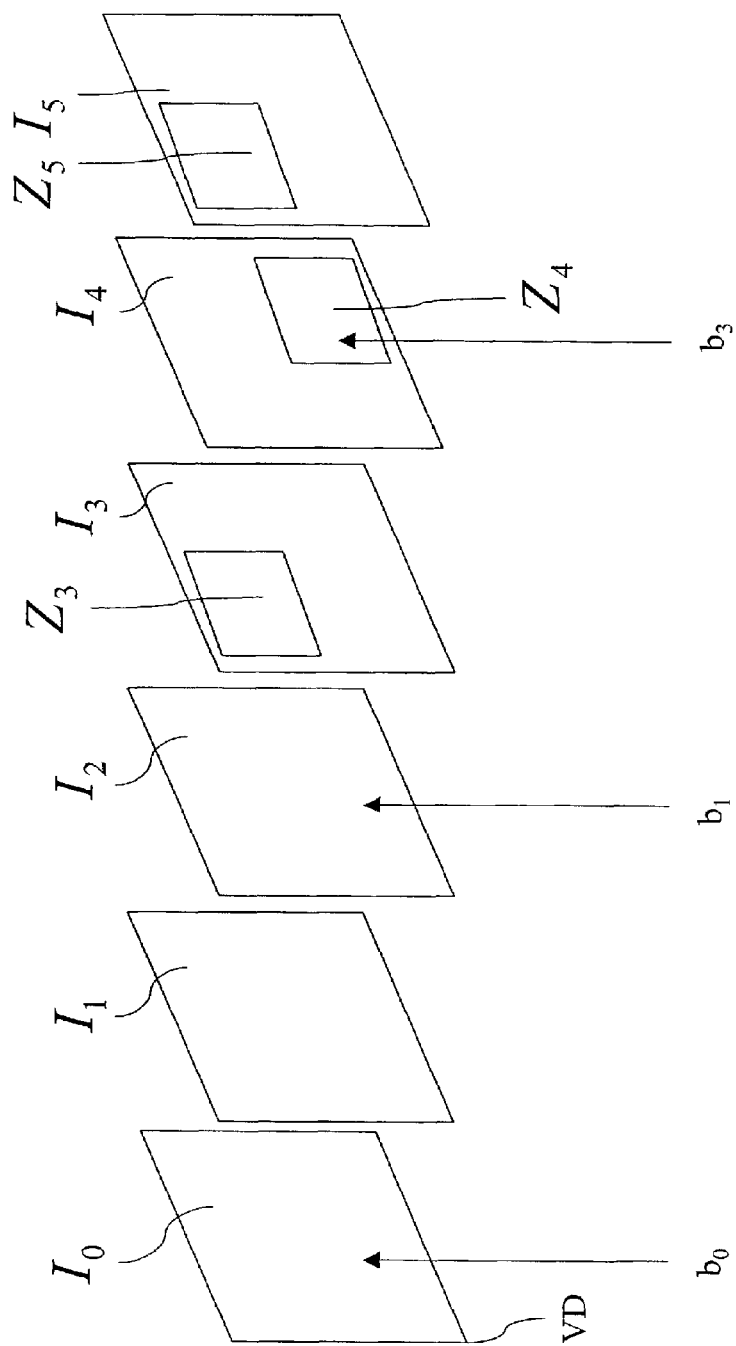
FIG. 4 is a diagram of a sequence of images in which a message is inserted according to the first aspect of the invention.

The following step S3 is a test for checking whether the current image has an even index. As FIG. 4 shows diagrammatically, the images of even and odd index are processed differently according to the invention.

When the image is of even index, the step S3 is followed by the step S4, at which a symbol of the message is inserted into the current image.

The insertion is performed in the spatial domain, in a manner known per se. According to the example of FIG. 4, the sequence comprises six images $I_0$ to $I_5$ and the message to insert comprises three bits, $b_0$ to $b_2$. The bit $b_0$ is inserted in the image $I_0$, the bit $b_1$ is inserted in the image $I_2$, and the bit $b_2$ is inserted in the image $I_4$. No bit is inserted in the images $I_1$, $I_3$ and $I_5$.

The insertion of a bit $b_m$ in the image $I_n$ is performed in the following manner. A pseudo-random sequence $w_n$ is generated, for example as a function of a secret key. The bit $b_m$ to be inserted is then modulated by the pseudo-random sequence previously generated which results in a second pseudo-random sequence. A psycho-visual weighting factor $\alpha$ is applied to the second pseudo-random sequence to ensure its invisibility in the image.

The pseudo-random sequence thus modified is then added to the current image.

For a pixel $I_n(p, q)$ with coordinates (p, q) in the image, the result of the insertion is thus a transformed pixel $I'_n(p, q) = I_n(p, q) + b_m * \alpha(p, q) * w_n(p, q)$.

According to variant forms of embodiment, the insertion is carried out on a predetermined zone of the image or the insertion of several symbols is carried out on the same image.

The following step S5 is the progressive creation of a sequence of images VD', in which the earlier processed image is inserted.

When the response is negative at step S3, that is to say if the image has an odd index, step S3 is followed by the step S5. The current image, unmodified, is then inserted into the sequence VD' in course of creation.

Step S5 is followed by a step S6 which is a test to verify if the whole of the initial sequence has been processed. When the response is negative, this step is followed by the step S7 at which the parameter n is incremented by one unit in order to consider the next image in the sequence. Step S7 is followed by the previously described step S2.

When all the images of the sequence have been processed, then the new sequence VD' in which the message has been inserted is entirely formed. This sequence comprises images of odd index which are identical to the images of odd index of the initial sequence VD and images of even index in which bits have been inserted.

Of course, the insertion of the symbols of the message can be carried out on the images of odd index, and the images of even index are then unchanged.

The insertion can equally be carried out on one image out of every three, or out of every four, instead of one image out of two.

According to still another variant, when the insertion of a symbol is performed on a predetermined zone of an image, this zone being smaller than the image itself, the following image can be used in which to insert a symbol, provided that this second insertion is carried out on a zone which is not in spatial correspondence with the first zone.

Thus for example, in FIG. 4, the zone $Z_4$ of the image $I_4$ and the zones $Z_3$ and $Z_5$ of the images $I_3$ and $I_5$ can be used in which to insert message symbols, since these zones do no overlap if the images $I_3$, $I_4$ and $I_5$ are superimposed.

A zone in which a symbol has been inserted is then bounded temporally by two zones in which no symbol has been inserted.

Figure 5:
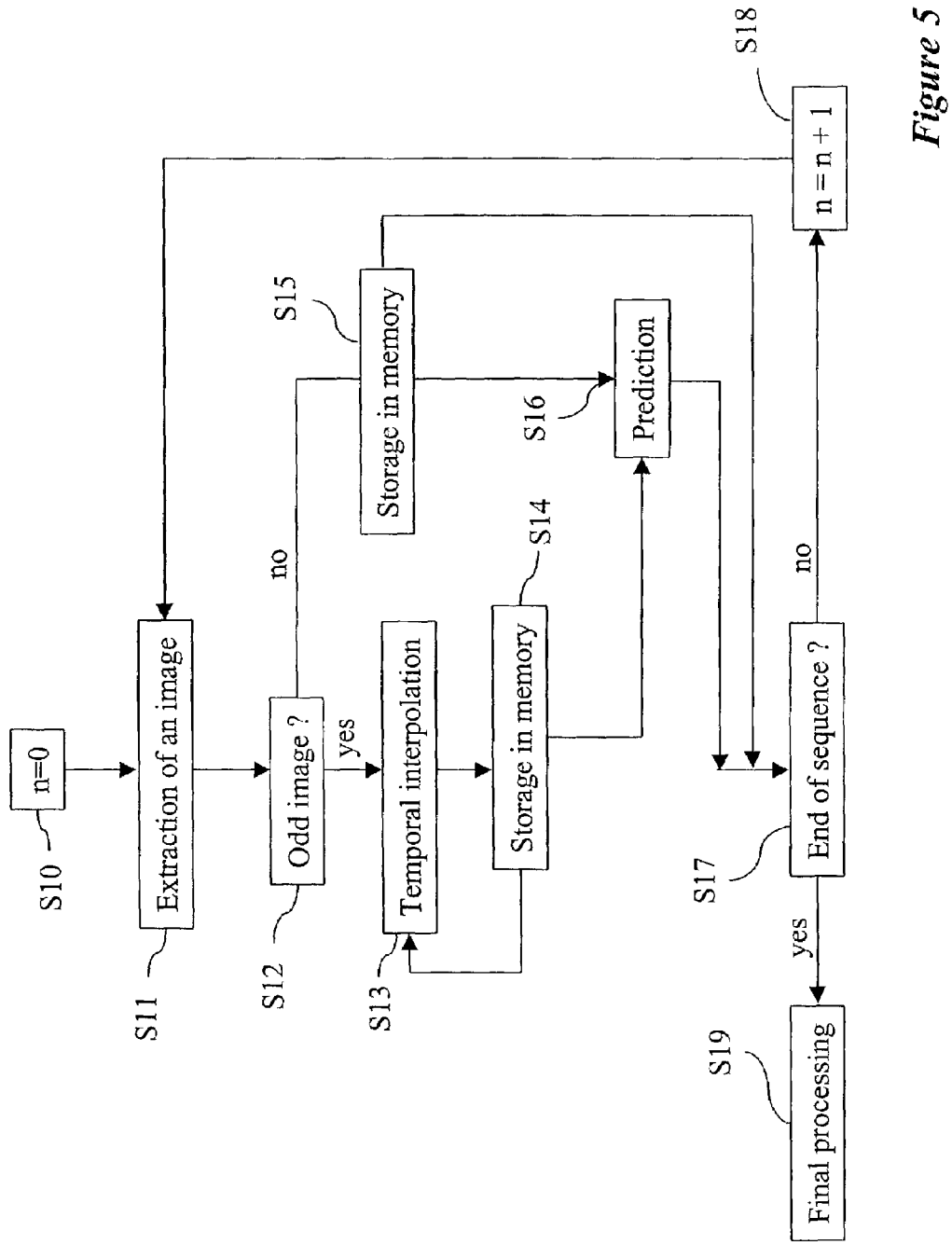
FIG. 5 is an embodiment of a method of message extraction from a sequence of images according to the first aspect of the invention.

FIG. 5 represents an embodiment of a method of extracting a message inserted previously in a sequence of images VD', according to the first aspect of the invention. The sequence of images VD' comprises images $I'_0$ to $I'_N$. This method is implemented in an extraction device and comprises steps S10 to S19.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S10 is the setting to zero of a parameter n. As at the insertion, the parameter n takes integer values between 0 and N, which represent the index of the current image.

The following step S11 is the extraction of an image $I'_n$ of the sequence. The images are extracted successively from the first to the last.

Figure 6:
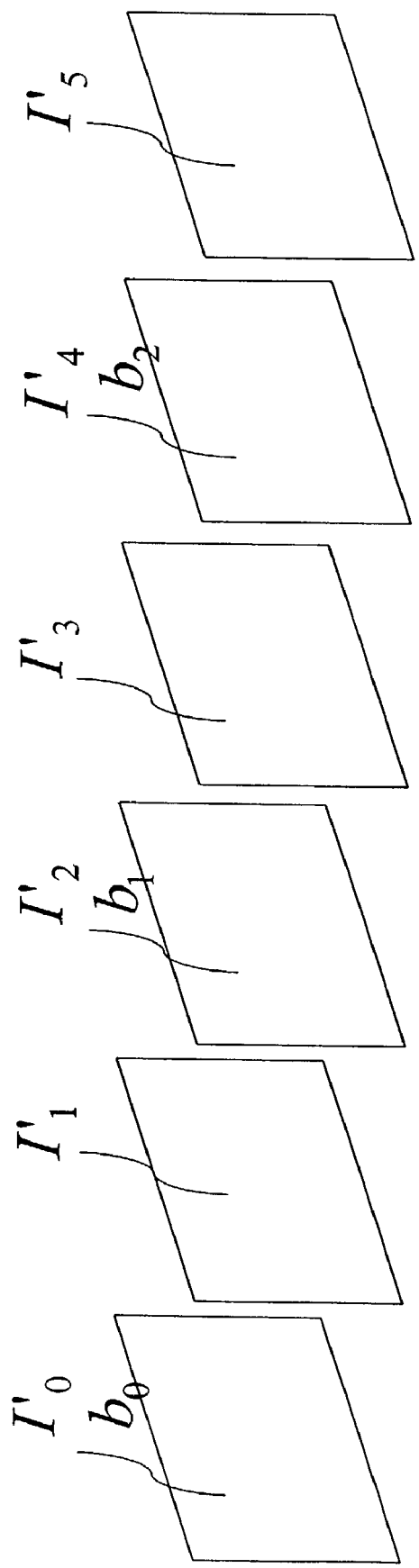
FIG. 6 is a diagram of a sequence of images from which a message is extracted according to the first aspect of the invention.

The following step S12 is a test for checking whether the current image has an odd index. As FIG. 6 shows diagrammatically, the images of even and odd index are processed differently according to the invention.

Where the current image has an odd index n, then the step S12 is followed by the step S13 at which the previous image of even index is predicted by temporal interpolation from the current image $I'_n$ and from the preceding image $I'_{n-2}$ of odd index which had been stored memory beforehand. The result is an interpolated image, of which the value of each pixel is obtained according to the formula:

$$\hat{I}_{n-1}(p,q) = (I_{n-2}(p+v_p^-(p,q), q+v_q^-(p,q)) + I_n(p+v_p^+(p,q), q+v_q^+(p,q))) / 2$$

In which:
n is a non-nil even integer,
p and q represent the coordinates of a pixel in the image,
$\vec{v}^-(p,q) = (v_p^-(p,q), v_q^-(p,q))$ and
$\vec{v}^+(p,q) = (v_p^+(p,q), v_q^+(p,q))$ are two-dimensional vectors.

The vector $\vec{v}^-(p,q) = (v_p^-(p,q), v_q^-(p,q))$ represents the movement corresponding to the displacement of the pixel $I_{n-1}(p, q)$ between the images $I_{n-1}$ and $I_{n-2}$. The vector $\vec{v}^+(p,q) = (v_p^+(p,q), v_q^+(p,q))$ represents the movement corresponding to the displacement of the pixel $I_{n-1}(p, q)$ between the images $I_{n-1}$ and $I_n$.

When $(p+v_p^-(p,q), q+v_q^-(p,q))$ or $(p+v_p^+(p,q), q+v_q^+(p,q))$ have a non-integer value, a bi-linear or bi-cubic interpolation of $I_{n-2}(p+v_p^-(p,q), q+v_q^-(p,q))$ and/or of $I_n(p+v_p^+(p,q), q+v_q^+(p,q))$ is carried out based on the four closest pixels in the images $I_{n-1}$ and $I_n$. This type of interpolation is simple to implement and is known to the person skilled in the art.

Several possibilities exist for the calculation of the vectors presented above. Three methods are described in what follows.

The first method consists in assuming that:

$\vec{v}^-(p,q) = (0,0)$ and $\vec{v}^+(p,q) = (0,0)$.

This assumption is the best compromise between quality of the prediction and time of calculation.

In the second method, a dense field of vectors is calculated between the images $I_n$ and $I_{n-2}$. For each pixel of coordinates (p, q) of the image $I_n$, a vector $\vec{v}_n(p,q)$ thus exists characterizing the movement between the images $I_n$ and $I_{n-2}$. The calculation of this dense field is set out below.

Based on this field of vectors, it is possible to calculate vectors $\vec{v}^-(p,q)$ and $\vec{v}^+(p,q)$ for any pixel of coordinates (p,q) of the image $I_{n-1}$. As already specified, the vector $\vec{v}^-(p,q)$ characterizes the movement of the pixel of coordinates (p, q) between the images $I_{n-1}$ and $I_{n-2}$. The vector $\vec{v}^+(p,q)$ characterizes the movement of the pixel of coordinates (p, q) between the images $I_{n-1}$ and $I_n$. To calculate the vectors $\vec{v}^-(p,q)$ and $\vec{v}^-(p,q)$, each vector $\vec{v}_n(p,q) = (v^p(p,q), v^q(p,q))$ of the image $I_n$ is projected onto the image $I_{n-1}$ in a point of coordinates: $(p+(v^p(p,q)/2), q+(v^q(p,q)/2))$.

A two-dimensional vector of values $$\vec{v}_{n-1}^{(p,q)} = (v^p(p,q)/2, v^q(p,q)/2)$$

corresponds to each of these projected points. All these projected points which we will call $\{(x_p, y_p)\}$ generally fall on non-integer positions of the image $I_{n-1}$. It is thus appropriate to calculate vector values at all integer positions of the image $I_{n-1}$ based on vectors $$\vec{v}_{n-1}^{(p,q)}.$$

For this, a method of interpolation known to the person skilled in the art is used. Based on the projected points $\{(x_p, y_p)\}$, a Delaunay triangulation is calculated. This triangulation is a set of connected triangles whose vertexes are at $\{(x_p, y_p)\}$. The values of the vectors associated with $\{(x_p, y_p)\}$ are $$\vec{v}_{n-1}^{(p,q)} = (v^p(p,q)/2, v^q(p,q)/2).$$

Based on these positions and values, it is possible to calculate for any pixel of integer coordinates (p, q) a vector characterizing at (p, q) the movement between $I_{n-2}$ and $I_{n-2}$ using an interpolation method based on a model of affine movement (movement model with 6 parameters) associated with each triangle of the Delaunay triangulation. More details on this type of models may for example be found in "Echantillonnage irrégulier et interpolation : application à la représentation d'images fixes et animées" (the translation of this title being "Irregular sampling and interpolation: application to fixed and moving images"), a thesis of Rennes University, France, Dec. 1, 1997, by Hervé Le Floch.

Once these interpolation operations have been performed, for any pixel of coordinates (p, q) of the image $I_{n-1}$ a set of vectors $\vec{v}^-$ exists characterizing the movement of the pixel of coordinates (p, q) between the images $I_{n-1}$ and $I_{n-2}$.

Similarly, for each of the pixels of coordinates (p, q) of the image $I_{n-1}$, a set of vectors $\vec{v}^+$ also exists characterizing the movement of the pixel of coordinates (p, q) between the images $I_{n-1}$ and $I_n$.

The following relationships:

$$\vec{v}^-(p,q) = -\vec{v}^+(p,q)$$

$$\vec{v}^-(p,q) = (v_p^-(p,q), v_q^-(p,q)) \text{ and}$$

$$\vec{v}^+(p,q) = (v_p^+(p,q), v_q^+(p,q))$$

make it possible to perform the temporal prediction of step S13 according to the formula:

$$\hat{I}_{n-1}(p,q) = (I_{n-2}(p+v_p^-(p,q), q+v_q^-(p,q)) + I_n(p+v_p^+(p,q), q+v_q^+(p,q)))/2$$

We will now describe how we calculate the dense field of vectors between the images $I_n$ and $I_{n-2}$. The object is to associate, with each pixel of coordinates (p, q) of the image $I_n$, a vector value characterizing the movement of the structures of the image.

For this, a method known to the person skilled in the art is used. A set of regularly spaced apart points (for example a grid) is chosen in the image $I_n$. Based on these points, a Delaunay triangulation is generated. For each point, a value of vectors is calculated. A method making it possible to initialize these values of vectors may be an algorithm of block-matching with blocks of size 8×8 centered on each point. The block-matching algorithm defines the translation movement of each point considered.

Based on these vectors, a dense field of vectors is generated for each pixel of the image $I_n$ by interpolation considering an affine movement model with 6 parameters per triangle.

Based on this first dense field, a predicted image $\hat{I}_n$ is constructed, for example according to the formula $\hat{I}_n(p,q) = I_{n-2}(p+v_p(p,q), q+v_q(p,q))$.

If the positions $(p+v_p(p,q), q+v_q(p,q))$ are not integer then a bi-linear or bi-cubic interpolation is carried out on the image $I_{n-2}$ in order to obtain the value $\hat{I}_n(p,q)$.

The mean DFD error between the image $I_n$ and the predicted image $\hat{I}_n$ is then calculated.

Next, the value of each of the vectors at the key points is optimized in order to minimize the reconstruction error between the image $I_n$ and the predicted image $\hat{I}_n$, by minimizing the mean DFD error. Several optimization methods exist: an optimization by gradient descent is proposed in "Modélisation du mouvement par Treillis Actifs et méthodes d'estimation associées. Application au codage de séquences d'images" (the translation of this title being "Movement modeling by Active Lattices and associated estimation methods. Application to the encoding of sequences of images"), a thesis of Rennes 1 University, France, Dec. 1, 1996, by Marie Dudon. An optimization algorithm by deterministic relaxation is proposed in "Echantillonnage irrégulier et interpolation: application à la représentation d'images fixes et animées" (the translation of this title being "Irregular sampling and interpolation: application to the representation of fixed and moving images"), a thesis of Rennes 1 University, France, Dec. 1, 1997, by Hervé Le Floch. It is important to note that at the time of the optimization process, the vectors positioned at the 4 corners of the image have a nil value, the vectors positioned at the top or at the bottom of the image have a nil vertical component, and the vectors positioned at the sides of the image have a nil horizontal component. After optimization of the vector values, the dense field between the images $I_n$ and $I_{n-2}$ is obtained.

In the third method, the vectors $\vec{v}^-(p,q) = (v_p^-(p,q), v_q^-(p,q))$ and $\vec{v}^+(p,q) = (v_p^+(p,q), v_q^+(p,q))$ are calculated using block-matching algorithms. The image $I_{n-1}$ is divided up into blocks of equal size. Blocks of size 8×8 are for example considered. The vectors $\vec{v}^-$ correspond to the movements between the images $I_{n-1}$ and $I_{n-2}$ calculated by the block-matching algorithm. The vectors $\vec{v}^+$ correspond to the movements between the images $I_{n-1}$ and $I_n$ calculated by the block-matching algorithm.

Each block of the image $I_{n-1}$ is considered. Let it be supposed that the block of index k of the image $I_{n-1}$ is to be processed. For this block, the block-matching algorithm searches, in the image $I_{n-2}$, for the corresponding block according to a translational movement model. This block minimizes the error of movement compensation. This type of technique is known to the person skilled in the art. The vector characterizing this movement is called $\vec{V}_k^-$.

To each pixel of coordinate (p, q) of the current block the value of vector $\vec{V}_k^-$: $\vec{v}^-(p,q) = \vec{V}_k^-$ is attributed.

Still for this block of index k, the block-matching algorithm searches, in the image $I_n$, for the corresponding block according to a translational movement model. This block minimizes the error of movement compensation. The vector characterizing this movement is called $\vec{V}_k^+$.

To each pixel of coordinate (p, q) of the current block the value of vector $\vec{V}_k^+$: $\vec{v}^+(p,q) = \vec{V}_k^+$ is attributed.

Once all the blocks have been processed, the temporal interpolation formula $\hat{I}_{n-1}(p,q) = (I_{n-2}(p+v_p^-(p,q), q+v_q^-(p,q)) + I_n(p+v_p^+(p,q), q+v_q^+(p,q)))/2$ may be used.

At the following step S14, the current image $I'_n$ of odd index is stored in memory in place of the image $I'_{n-2}$ of odd index.

The following step S16 is an estimation of the symbol inserted in the preceding image of even index. First of all, the signal inserted in the preceding image is estimated according to the formula:

$$W(p,q) = I'_{n-1}(p,q) - \hat{I}_{n-1}(p,q)$$

In which $I'_{n-1}(p, q)$ is the image of even index previously stored in memory and $\hat{I}_{n-1}(p, q)$ is the image of even index predicted at step S13.

Only the coherent values of the estimated signal are kept, that is to say the values less than a threshold S. The other values are set to zero. It should be noted that when the message is inserted in the luminance signal of the images of a video, a threshold equal to 10 was satisfactorily used by the inventor.

A calculation of correlation between the estimated signal $W(p, q) = b_m(p, q)*\alpha*w_n(p, q)$ and the pseudo-random signal $w_n(p,q)$ makes it possible to recover the value of the inserted bit $b_m$. This bit is stored in memory.

When the response is negative at step S12, the current image is of even index. Step S12 is then followed by the step S15 at which the current image is stored in memory.

The image of even index stored in memory will be used during the prediction step S16, described earlier, of the next iteration.

The steps S15 and S16 are followed by the step S17 which is a test to verify if the whole of the sequence has been processed. When the response is negative, this step is followed by the step S18 at which the parameter n is incremented by one unit in order to consider the next image in the sequence. Step S17 is followed by the step S11 already described.

When all the images of the sequence have been processed, then step S17 is followed by the step S19 at which the extracted message is decoded. For example, if it is known that it is composed of ASCII characters, the extracted bits are grouped together in groups of eight bits, and one ASCII character is associated with each group.

In the case in which an image in which a symbol has been inserted is not surrounded by two images in which no symbol has been inserted, the predicted image of even index corresponds to the closest image from the temporal point of view in which no symbol has been inserted. This occurs in particular for the first or the last image of the video sequence.

In other cases where one of the images following or preceding the image in which a symbol has been inserted is not available (transmission error, decoding error, etc.) the images in which no symbol has been inserted which are temporally the closest are used with a weighting depending on the temporal distance between these images and the image in which a symbol has been inserted. For example, if only the images $I_{n-2}$ and $I_{n+2}$ are available for predicting the image $I_{n-1}$ of even index, the interpolation formula is:

$$\hat{I}_{n-1}(p,q)=(3*I_{n-2}(p,q)+I_{n+2}(p,q))/4$$

The method of extraction has been described assuming that the insertion had been carried out beforehand on one image out of two. Naturally, the extraction is adapted to the different possible variant forms of insertion which have been set out above, in particular the insertion in zones which are not in spatial correspondence from one image to the next.

Figure 7:
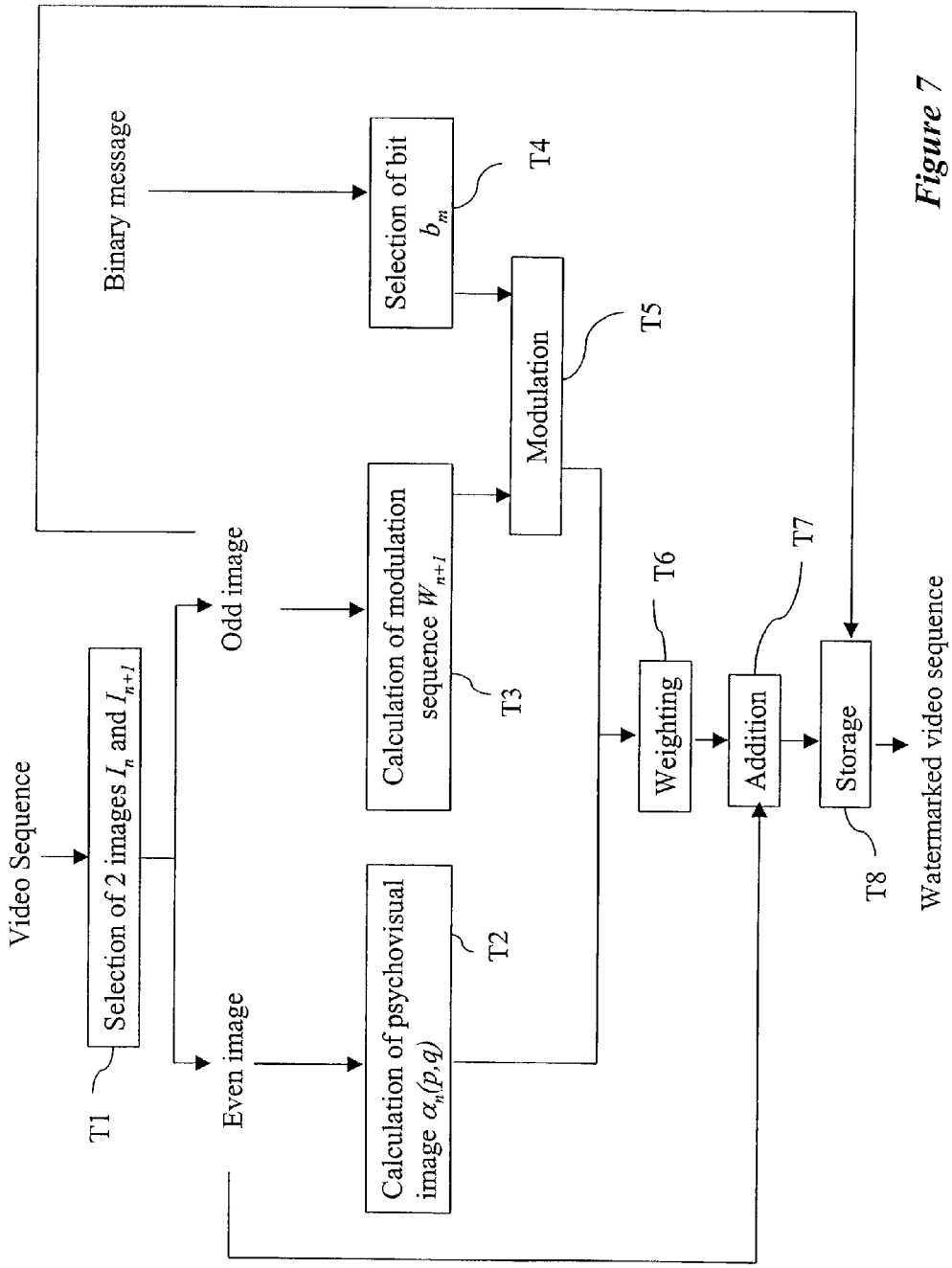
FIG. 7 is an embodiment of a method of message insertion in a sequence of images according to the second aspect of the invention.

FIG. 7 shows an embodiment of a method of message insertion in a sequence of images according to the second aspect of the invention. This method is implemented in the insertion device and comprises the steps T1 to T8.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

The method is described with respect to two images. It is reiterated for all the images of the sequence.

Step T1 is the selection of two images $I_n$ and $I_{n+1}$ in the sequence. One of them is the image in which a symbol insertion will be carried out and the other serves to generate a modulation sequence used for the insertion.

In this embodiment, the insertion is carried out on an image of even index and the following image, of odd index, serves to generate the modulation sequence. Of course, the insertion of the symbols of the message can be carried out on the images of odd index, and the images of even index are then unchanged.

The insertion can equally be carried out on one image out of every three, or out of every four, instead of one image out of two.

The image $I_n$ of even index is used at the step T2 to calculate a psycho-visual model on that image. This model is calculated in known manner, not detailed here. For any pixel $I_n(p, q)$ of this image, the maximum modification $\alpha_n(p, q)$ is determined that the pixel can undergo without this modification being visible. The result is a set of weighting factors.

The image $I_{n+1}$ of odd index is used at step T3 to generate a modulation sequence $w_{n+1}$. This step will be detailed below. The modulation sequence has the same size as the images of the sequence and its coefficients can take two values: −1 and +1.

Figure 8:
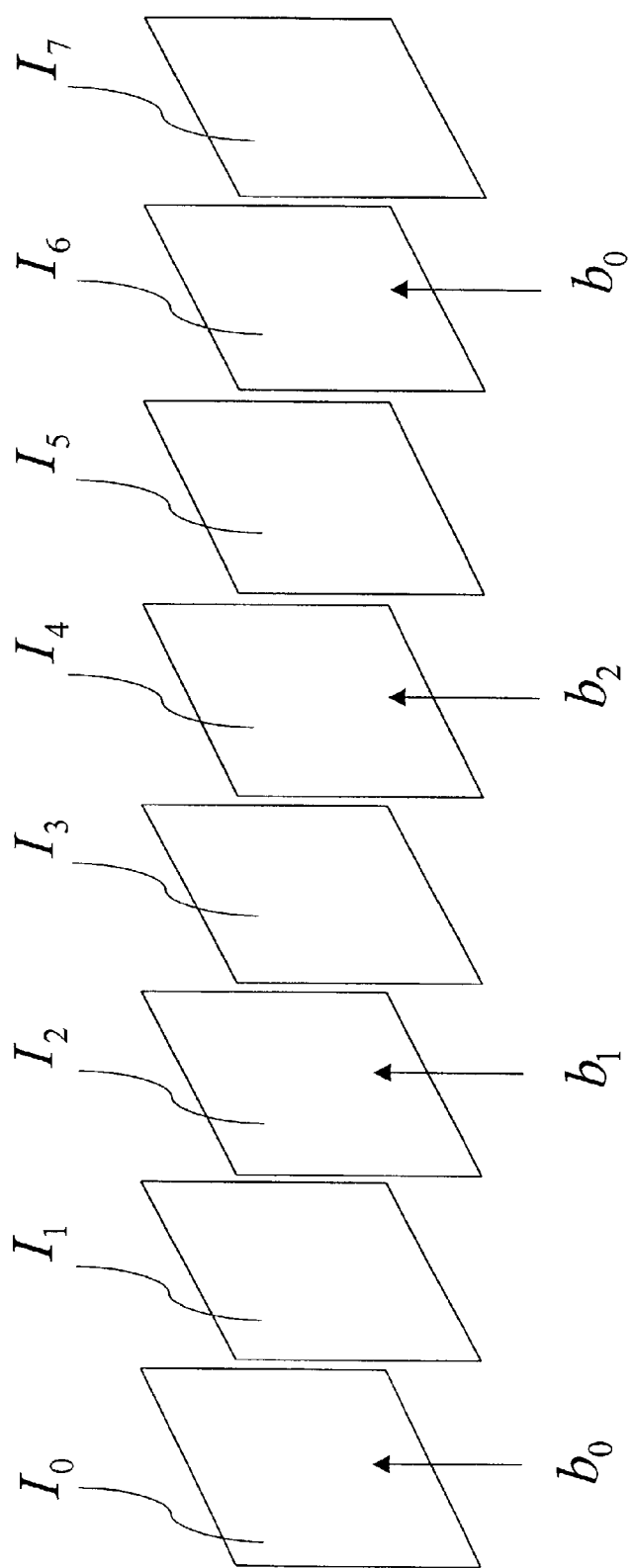
FIG. 8 is a diagram of a sequence of images in which a message is inserted according to the second aspect of the invention.

A bit $b_m$ of the binary message to be inserted is selected at the step T4. The selection of a bit $b_m$ is for example carried out as a function of the index n of the current image $I_n$ in which it is inserted. FIG. 8 is an example of bit selection for insertion. The video sequence comprises eight images $I_0$ to $I_7$ and the message comprises three bits $b_0$, $b_1$ and $b_2$. A bit $b_m$ is inserted in the image $I_n$ on condition that the integer m is equal to the remainder of the integer division of n/2 by the number of bits of the message to insert. If the value of the bit to insert is 0, it is changed into −1.

Steps T3 and T4 are followed by step T5 at which the bit $b_m$ to be inserted is modulated by the modulation sequence generated at step T3. The result is a second modulation sequence: $W_{n+1}=b_m.w_{n+1}$. A coefficient $W_{n+1}(p, q)$ of this modulation sequence is determined by the formula: $W_{n+1}(p, q)=b_m.w_{n+1}(p, q)$.

Steps T2 and T5 are followed by the step T6 at which the weighting factors $\alpha_n(p, q)$ determined at step T2 are applied to the second modulation sequence. The result is a third sequence which has maximum energy while remaining invisible after insertion in the image.

The following step T7 is the insertion of the third sequence in the image of even index. The result is an image $I'_n$ of which the pixels are determined by the formula: $I'_n(p, q)=I_n(p, q)+\alpha_n(p, q).b_m.w_{n+1}(p, q)$.

The following step T8 is the storage of the image $I'_n$ in which the bit has been inserted and the image $I_{n+1}$ of odd index.

When all the images of the sequence have been processed, then the new sequence VD' in which the message has been inserted is entirely formed. This sequence comprises images of odd index which are identical to the images of odd index of the initial sequence VD and images of even index in which bits have been inserted.

Figure 9:
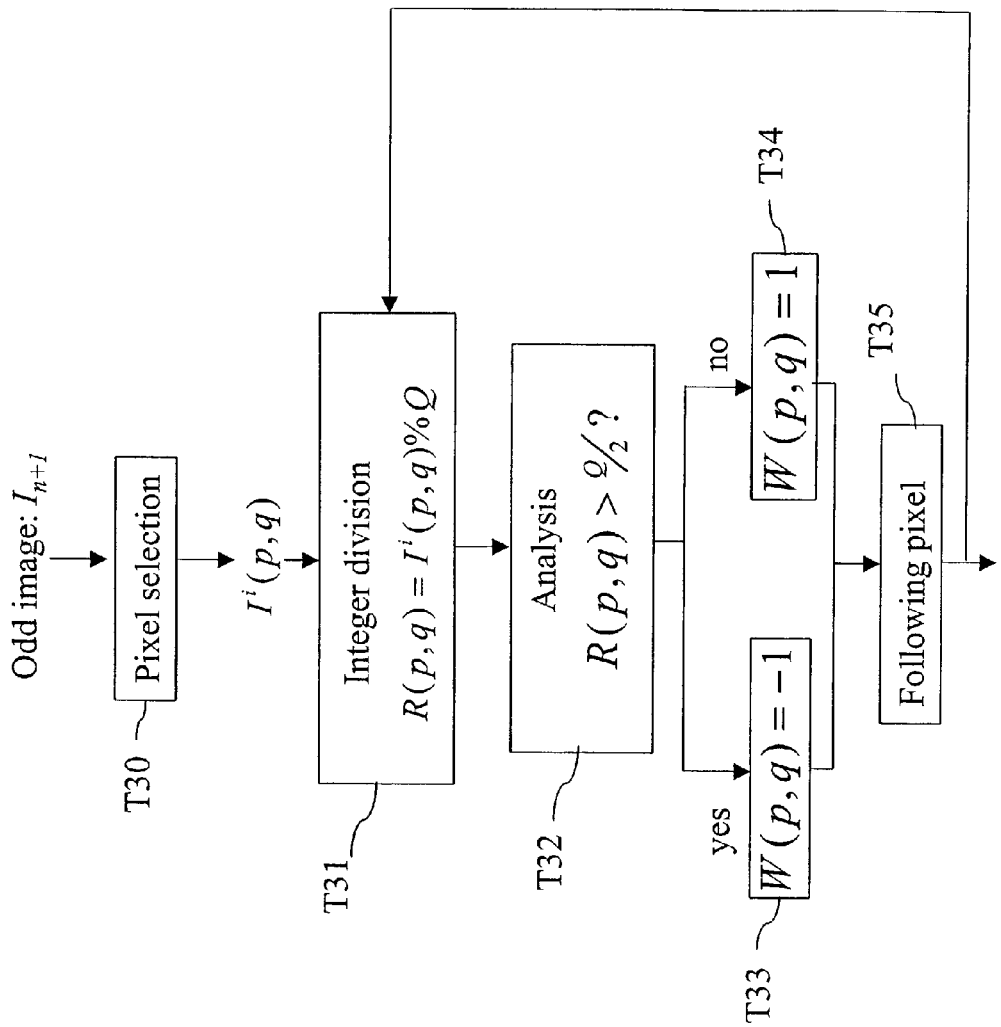
FIG. 9 shows a modulation sequence calculation included in the method of FIG. 7.

FIG. 9 represents an embodiment of the step T3 of calculating the modulation sequence $w_{n+1}$ from the current image $I_{n+1}$ of odd index. The calculation comprises the steps T30 to T35.

The step T30 is the selection of a pixel of the image. The image is processed pixel by pixel. At least one component of each pixel is considered. According to the representation mode of the pixels, this component concerns the luminance or the chrominance or one of the colors red, green or blue. In what follows, the luminance component $I^i(p, q)$ of the current pixel is considered.

The following step T31 is the integer division of the value of the luminance component $I^i(p, q)$ of the current pixel by a value Q, for example equal to 16.

The value Q is determined experimentally as a function of a compromise between the invisibility of the inserted message and the robustness of the compression. More particularly, if the value of Q is too high, the modulation sequences generated may have significant low-pass frequency characteristics. Their insertion could therefore be visible.

Conversely, if the value of Q is too small, the invisibility of the modulation sequence is better, but the robustness of the compression is low. A slight modification of the image serving to generate the demodulation sequence will prevent the generation of a demodulation sequence close to the modulation sequence.

This division has a remainder R(p, q) which is analyzed at the following step T32. At this step, the remainder R (p, q) is compared to the value Q/2. When the remainder R(p, q) is greater than Q/2, step T32 is followed by the step T33 at which a coefficient $w_{n+1}(p, q)$ of the modulation sequence is set to the value −1.

When the remainder R(p, q) is less than Q/2, step T32 is followed by the step T34 at which a coefficient $w_{n+1}(p, q)$ of the modulation sequence is set to the value +1.

The steps T33 and T34 are followed by the step T35 at which the following pixel is considered, so long as all the pixels of the current image have not been processed. Step T35 is then followed by the previously described step T31.

When all the pixels have been processed, the modulation sequence has been completely defined and the step T35 is followed by the step T4 already described.

Figure 10:
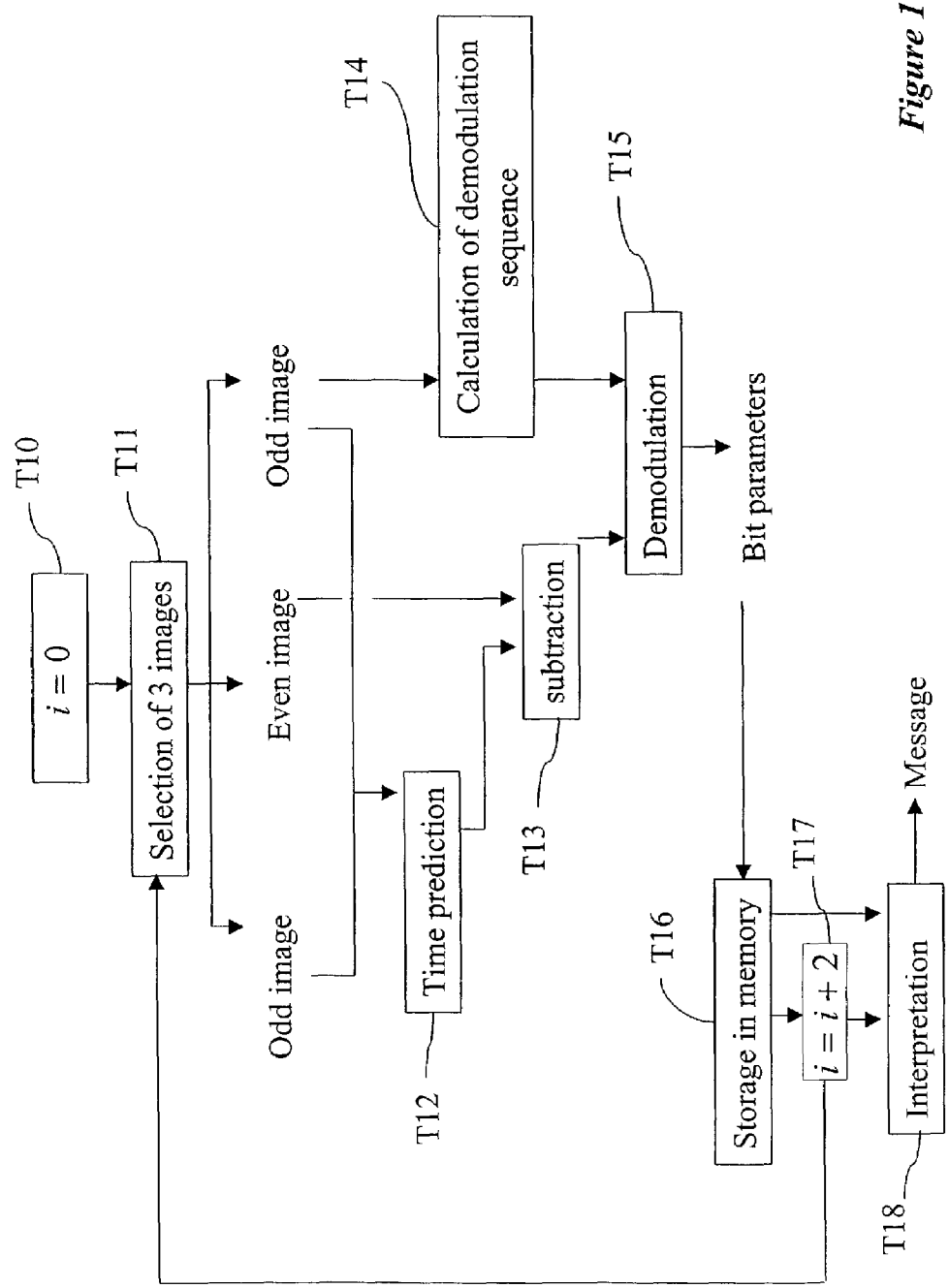
FIG. 10 is an embodiment of a method of message extraction from a sequence of images according to the second aspect of the invention.

FIG. 10 represents an embodiment of a method of extracting a message inserted previously in a sequence of images VD', according to the second aspect of the invention. This sequence of images can be either directly the sequence of images obtained after insertion of a message (result of the method of FIG. 7) or else a modified version of that sequence. These modifications may, for example, be a compression followed by a decompression and/or a geometrical distortion. The sequence of images VD' comprises images $I'_0$ to $I'_N$. This method is implemented in an extraction device and comprises steps T10 to T18.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step T10 is an initialization at which a parameter i is set to the value 0. The parameter i represents the index of the current image.

The following step T11 is the selection of the three images $I'_{i-1}$, $I'_i$ and $I'_{i+1}$ of the sequence VD'. When the image $I'_{i-1}$ does not exist, it is replaced by the image $I'_{i+1}$. Conversely, when the image $I'_{i+1}$ does not exist, it is replaced by the image $I'_{i-1}$.

The following step T12 is a time prediction of the image $I'_i$ of even index. A predicted image $\hat{I}_i$ is calculated from the images $I'_{i-1}$ and $I'_{i+1}$. More particularly, a pixel $\hat{I}_i(p, q)$ of the predicted image $\hat{I}_i$ is calculated according to the following formula:

$$\hat{I}(p,q)=(I'_{i-1}(p,q)+I'_{i+1}(p,q))/2$$

The following step T13 is the subtraction of the predicted image $\hat{I}_i$ from the current image $I'_i$. The result is an estimated watermarking signal $\tilde{W}$.

Step T14 is a calculation of the demodulation sequence W' from the image $I_{i+1}$ of odd index. This step is similar to step T3 already described.

The steps T13 and T14 are followed by the step T15 which is the demodulation of the estimated watermarking signal in order to deduct the bit which had been inserted in the current image.

For this four parameters are calculated:

$$S_+ = \sum_{(p,q)} \tilde{W}(p, q) * F_{W'(p,q)>0}$$

$$N_+ = \sum_{(p,q)} F_{W'(p,q)>0}$$

$$S_- = \sum_{(p,q)} \tilde{W}(p, q) * F_{W'(p,q)<0}$$

$$N_- = \sum_{(p,q)} F_{W'(p,q)<0}$$

The value of the function $F_{condition}$ is 1 if the condition is true and 0 otherwise.

At the following step T16, a sum of each of these parameters is calculated by adding them respectively to the parameters already calculated for the same current bit. For example, for the bit $b_m$, the values $S_+$, $S_-$, $N_+$, $N_-$ are added to the values connected to the bit $b_m$ and previously stored in memory. We therefore have:

$$S^m_+ = S^m_+ + S_+,$$

$$S^m_- = S^m_- + S_-,$$

$$N^m_+ = N^m_+ + N_+ \text{ et}$$

$$N^m_- = N^m_- + N_-.$$

The values $S^m_+$, $S^m_-$, $N^m_+$ and $N^m_-$ are initialized to 0 at the start of the extraction algorithm.

Step T16 is followed by the step T17 at which the parameter i is incremented by two units in order to consider a following image of even index. Step T17 is then followed by the step T11 already described.

When all the images of the sequence have been processed, step T16 is followed by the step T18 which is the interpretation of the parameters of each bit.

For each bit $b_m$, the difference of average $D=(S^m_+/N^m_+)-(S^m_-/N^m_-)$ is calculated. If the difference D is positive, then the bit is equal to 1. If the difference D is negative, then the bit is equal to 0. It should be noted that this manner of decoding the bits inserted in the sequence of images may be replaced by any other measurement of correlation between the demodulation sequence W' generated at step T14 and the sequence connected to the bit inserted generated at step T13.

The extracted message is then decoded. For example, if it is known that it is composed of ASCII characters, the extracted bits are grouped together in groups of eight bits, and one ASCII character is associated with each group.

Step T17 may possibly be followed by the step T18 which enables the interpretation to be made of the data collected before the total processing of the video sequence. This intermediate interpretation enables the message inserted in the video to be known more rapidly.

Figure 11:
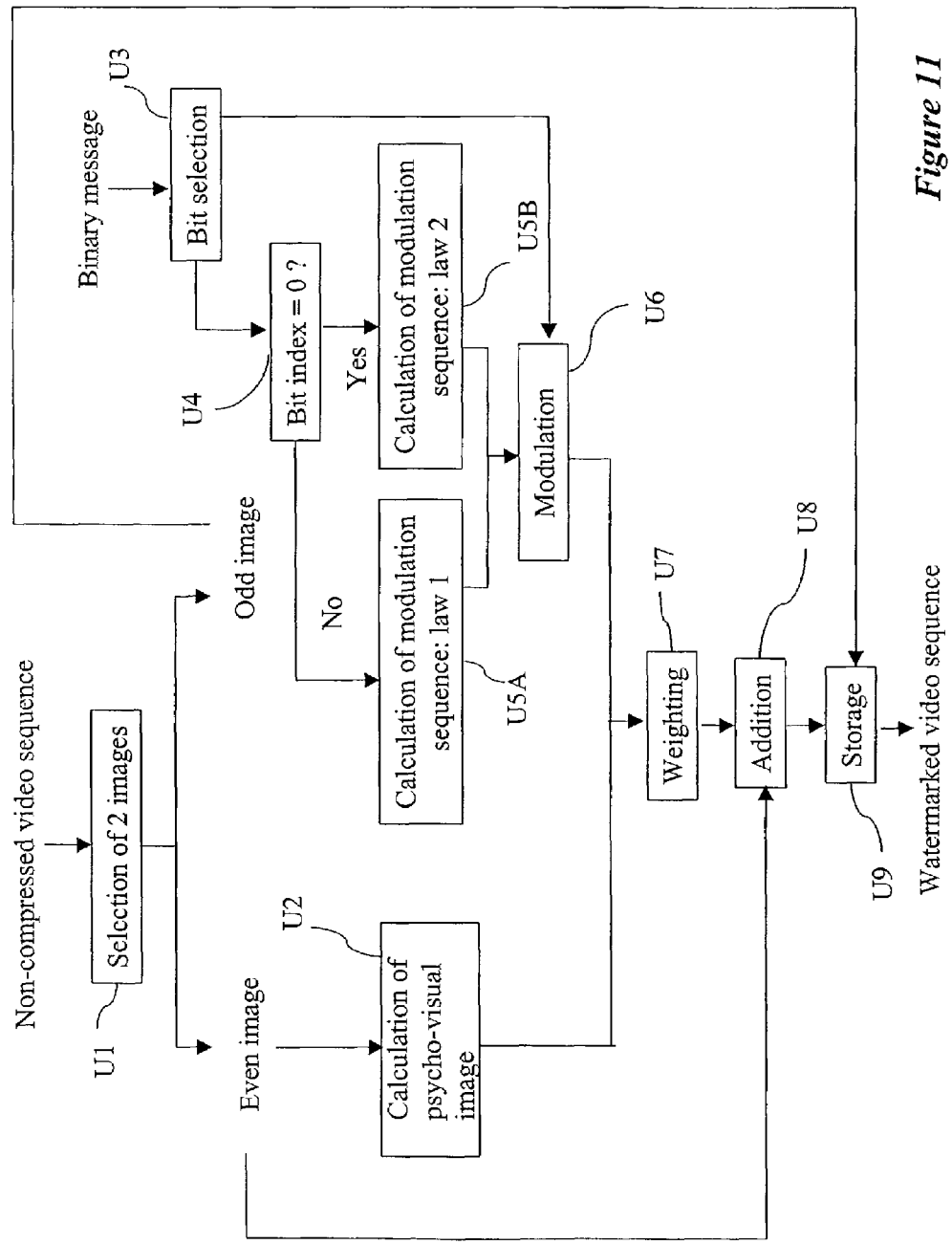
FIG. 11 is an embodiment of a method of message insertion in a sequence of images according to the third aspect of the invention.

FIG. 11 shows an embodiment of a method of message insertion in a sequence of images according to the third aspect of the invention. This method is implemented in the insertion device and comprises the steps U1 to U9.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

The method is described with respect to two images. It is reiterated for all the images of the sequence.

Step U1 is the selection of two images $I_n$ and $I_{n+1}$ in the sequence. One of them is the image in which a symbol insertion will be carried out and the other serves to generate a modulation sequence used for the insertion.

In this embodiment, the insertion is carried out on an image of even index and the following image, of odd index, serves to generate the modulation sequence. Of course, the insertion of the symbols of the message can be carried out on the images of odd index, and the images of even index are then unchanged.

The insertion can equally be carried out on one image out of every three, or out of every four, instead of one image out of two.

The image $I_n$ of even index is used at the step U2 to calculate a psycho-visual model on that image. This model is calculated in known manner, not detailed here. For any pixel $I_n(p, q)$ of this image, the maximum modification $\alpha_n(p, q)$ is determined that the pixel can undergo without this modification being visible. The result is a set of weighting factors.

A bit $b_m$ of the binary message to be inserted is selected at the step U3. The selection of a bit $b_m$ is for example carried out as a function of the index n of the current image $I_n$ in which it is inserted. FIG. 8 is an example of bit selection for insertion. The video sequence comprises eight images $I_0$ to $I_7$ and the message comprises three bits $b_0$, $b_1$ and $b_2$. A bit $b_m$ is inserted in the image $I_n$ on condition that the integer m is equal to the remainder of the integer division of n/2 by the number of bits of the message to insert. If the value of the bit to insert is 0, it is changed into −1.

The following step U4 is a test to determine whether the index of the current bit is equal to a predetermined value, for example zero. If the response is negative, then step U4 is followed by the step U5A. If the response is positive at step U4, this step is followed by the step U5B.

The image $I_{n+1}$ of odd index is used at step U5A or at the step U5B to generate a modulation sequence $w_{n+1}$. The steps U5A and U5B are distinguished from each other by their laws used for modulation sequence generation. The selection between these two laws is carried out as a function of the index of the bit to be inserted. When the index of the bit to be inserted is different to 0, then the first law of step U5A is used. When the index of the bit to be inserted is equal to 0, then the second law of step U5B is used.

Steps U5A and U5B will be detailed below. In the two cases, the modulation sequence has the same size as the images of the sequence and its coefficients can take two values: −1 and +1.

Steps U3, U5A and U5B are followed by the step U6 at which the bit $b_m$ to be inserted is modulated by the modulation sequence generated at step U5A or U5B. The result is a second modulation sequence: $W_{n+1}=b_m \cdot w_{n+1}$. A coefficient $W_{n+1}(p, q)$ of this modulation sequence is determined by the formula: $W_{n+1}(p, q)=b_m \cdot w_{n+1}(p, q)$.

Steps U2 and U6 are followed by the step U7 at which the weighting factors $\alpha_n(p, q)$ determined at step U2 are applied to the second modulation sequence. The result is a third sequence which has maximum energy while remaining invisible after insertion in the image.

The following step U8 is the insertion of the third sequence in the image of even index. The result is an image $I'_n$ of which the pixels are determined by the formula: $I'_n(p, q)=I_n(p, q)+\alpha_n(p, q) \cdot b_m \cdot w_{n+1}(p, q)$.

The following step U9 is the storage of the image $I'_n$ in which the bit has been inserted and the image $I_{n+1}$ of odd index.

When all the images of the sequence have been processed, then the new sequence VD' in which the message has been inserted is entirely formed. This sequence comprises images of odd index which are identical to the images of odd index of the initial sequence VD and images of even index in which bits have been inserted.

FIG. 9 represents an embodiment of the step U5A of calculating the modulation sequence $w_{n+1}$ from the current image $I_{n+1}$ of odd index, according to the first law.

Figure 12:
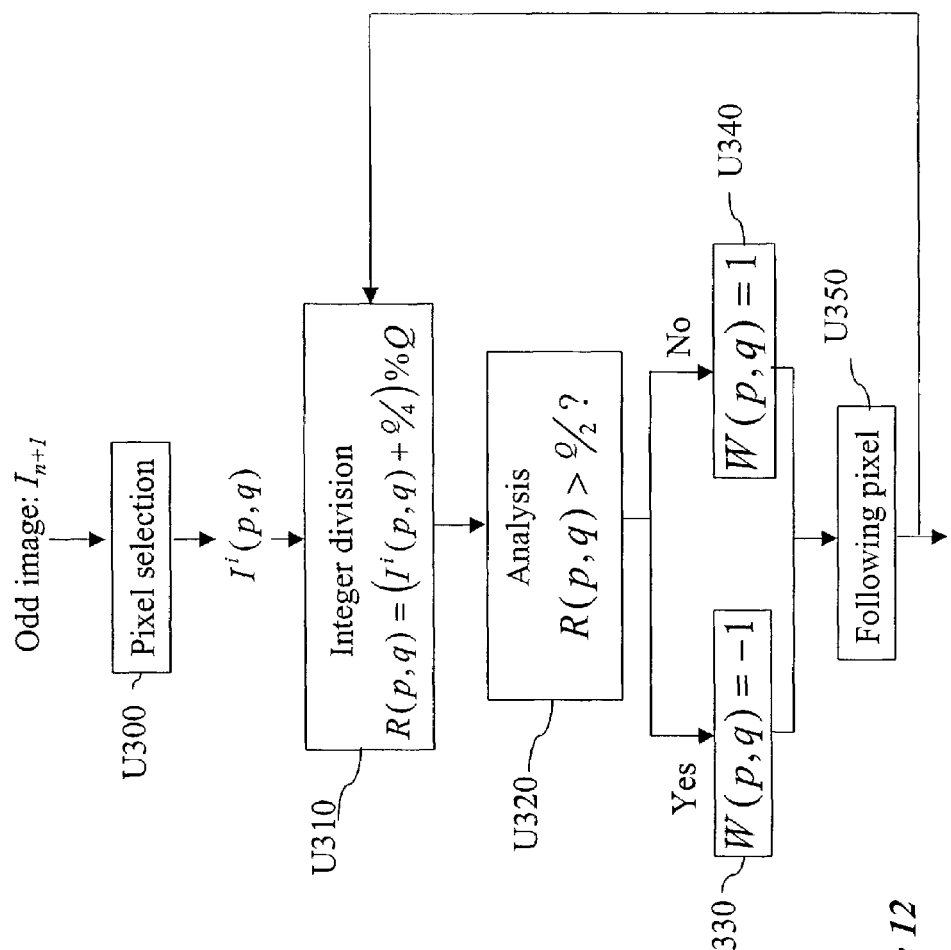
FIGS. 12 and 13 show embodiments for modulation sequence calculations included in the method of FIG. 11.

FIG. 12 represents a first embodiment of the step U5B of calculating the modulation sequence $w_{n+1}$ from the current image $I_{n+1}$ of odd index, according to the second law. This calculation comprises the steps U300 to U350 which are respectively similar to the steps T30 to T35 of FIG. 9, except for step U310.

In fact, step U310 is the calculation of the remainder of the integer division of the quantity $(I^i(p, q)+Q/4)$ by the quantity Q.

This second law makes it possible to obtain a modulation sequence that is different to that obtained with the first law. Moreover, the sequences obtained with the first and the second law are quasi-orthogonal. The following property is satisfied: $<w_2, w_2> >> <w_1, w_2>$.

In the proceeding formula, $<X, Y>$ is a correlation measurement between the vector X and the vector Y.

Figure 13:
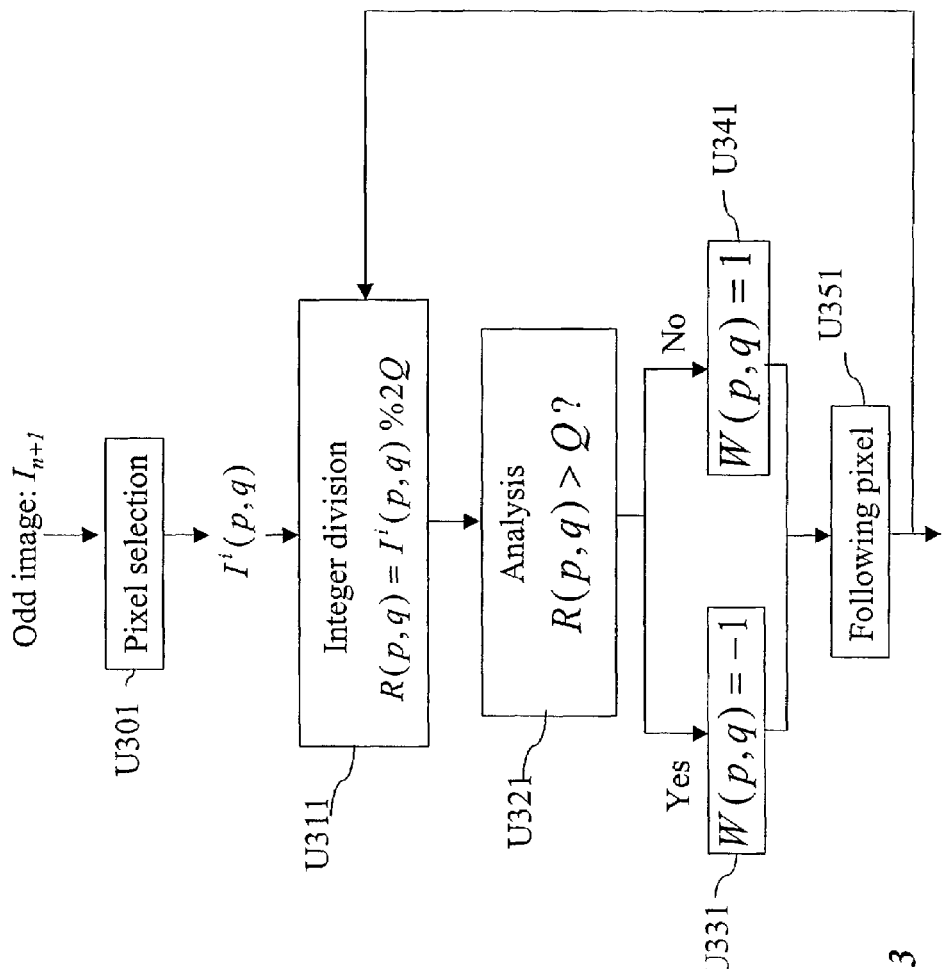

FIG. 13 represents a second embodiment of the step U5B of calculating the second modulation sequence $w_{n+1}$ from the current image $I_{n+1}$ of odd index, according to the second law. This calculation comprises the steps U301 to U351 which are respectively similar to the steps T30 to T35 of FIG. 9, except for steps U311 and U321.

In fact, step U311 is the calculation of the remainder of the integer division of the quantity $I^i(p, q)$ by the quantity 2. Q.

The step U321 is the comparison of the remainder of the integer division with the value Q.

This second law makes it possible to obtain a modulation sequence that is different to that obtained with the first law. Moreover, the sequences obtained with the first and the second law are quasi-orthogonal. The following property is satisfied: $<w_2, w_2> >> <w_1, w_2>$.

In the proceeding formula, $<X, Y>$ is a correlation measurement between the vector X and the vector Y.

Figure 14:
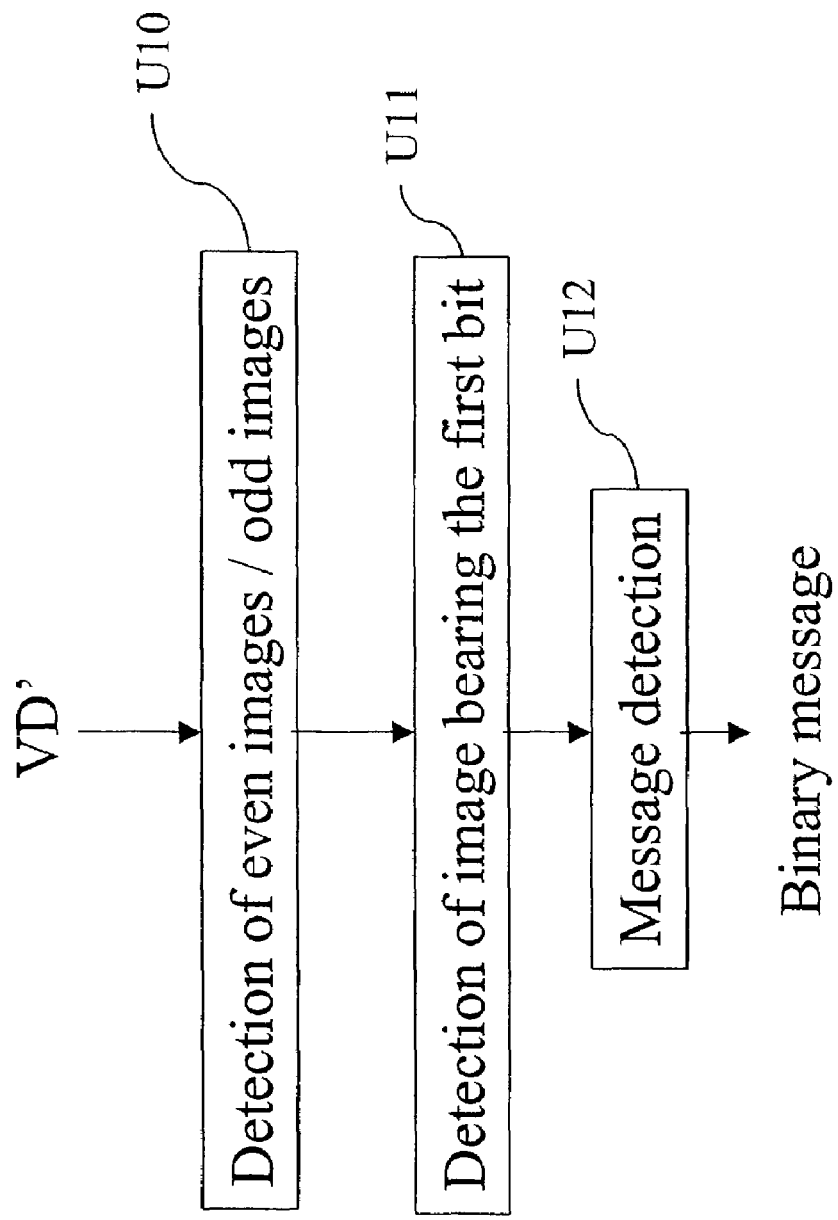
FIG. 14 shows an embodiment of a method of message extraction from a sequence of images according to the third aspect of the invention.

FIG. 14 represents an embodiment of a method of extracting a message inserted previously in a sequence of images VD', according to the third aspect of the invention. This method is implemented in an extraction device and comprises steps U10 to U12.

This sequence of images can be either directly the sequence of images obtained after insertion of a message (result of the method of FIG. 11) or else a modified version of that sequence. These modifications may, for example, be a compression followed by a decompression and/or a geometrical distortion. The sequence of images VD' comprises images $I'_0$ to $I'_N$. Moreover, the images of the sequence could have been deleted at the start and at the end of the sequence.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step U10 is the detection of images in which a message symbol has been inserted. This embodiment involves detecting the images of even index and the images of odd index. This step will be detailed below.

The following step U11 is the detection of the images bearing the first symbol inserted $b_0$. This step will be detailed below.

The following step U12 is the decoding of the message. This step will be detailed below.

Figure 15:
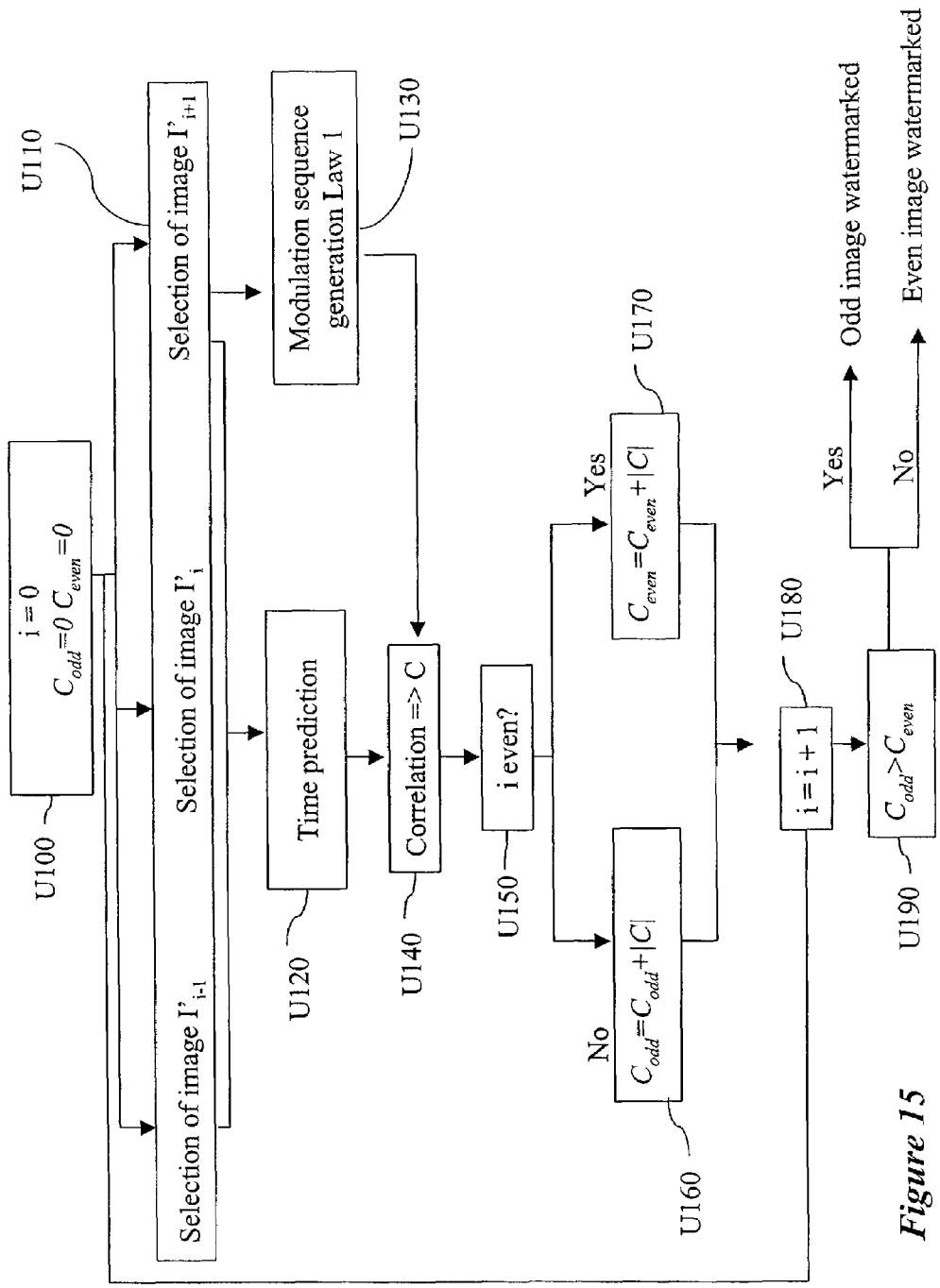
FIG. 15 shows an embodiment for detection of images in which message symbols have been inserted, included in the method of FIG. 14.

FIG. 15 is an embodiment of step U10 of detecting the images in which a message symbol has been inserted. This detection comprises the steps U100 to U190.

Step U100 is a setting operation at which three parameters i, $C_{even}$ and $C_{odd}$ are set to the value 0. The parameter i represents the index of the current image. The parameters $C_{even}$ and $C_{odd}$ represent a cumulation of correlation values for the images of respectively even and odd index.

The following step U110 is the selection of the three images $I'_{i-1}$, $I'_i$ and $I'_{i+1}$ of the sequence VD'. When the image $I'_{i-1}$ does not exist, it is replaced by the image $I'_{i+1}$.

The following step U120 is a time prediction of the watermarking signal inserted in the image $I'_i$ of index i. For this, a predicted image $\hat{I}_i$ is calculated from the images $I'_{i-1}$ and $I'_{i+1}$. More particularly, a pixel $\hat{I}_i(p, q)$ of the predicted image $\hat{I}_i$ is calculated according to the following formula:

$$\hat{I}_i(p,q)=(I'_{i-1}(p,q)+I'_{i+1}(p,q))/2$$

The predicted image $\hat{I}_i$ is next subtracted from the current image $I'_i$. The result is an estimated watermarking signal $\tilde{W}$.

Step U130 is a calculation of demodulation sequence W' from the image $I_{i+1}$ of index i+1. This step is analogous to the step U5A already described. In other words, the first law is used.

The steps U120 and U130 are followed by the step U140 which is a measurement of the correlation C between the predicted watermarking signal and the modulation sequence calculated according to the first law. The correlation measurement C is strong if the current image is an image in which a bit has been inserted that is different to the first bit of the message. On the contrary, the correlation measurement C is low if no bit has been inserted in the current image or if the first bit of the message has been inserted in the current image.

The following step U150 is a test of whether the index of the current image is even.

If the index of the current image is even, then step U150 is followed by the step U160 at which the absolute value of the correlation measurement calculated at step U140 is added to the quantity $C_{even}$.

If the index of the current image is odd, then step U150 is followed by the step U170 at which the absolute value of the correlation measurement calculated at step U140 is added to the quantity $C_{odd}$.

The steps U160 and U170 are followed by the step U180 at which the parameter i is incremented by one unit in order to consider a following image in the sequence, if at least one image remains to be processed in the sequence. Step U180 is then followed by the previously described step U110.

When all the images of the sequence have been processed, or when a sufficient number of images have been processed, step U180 is simply followed by the step U190 which is a test to verify whether the relation: $C_{odd}>C_{even}$ is true.

When the response is positive, this means that the images of odd index are the images in which a message symbol has been inserted. This may be due to the deletion of an odd number of images at the start of the sequence. In the opposite case, this means that the images of even index are the images in which a message symbol has been inserted. In this case, no image deletion has been carried out, or an even number of images have been deleted at the start of the sequence.

Figure 16:
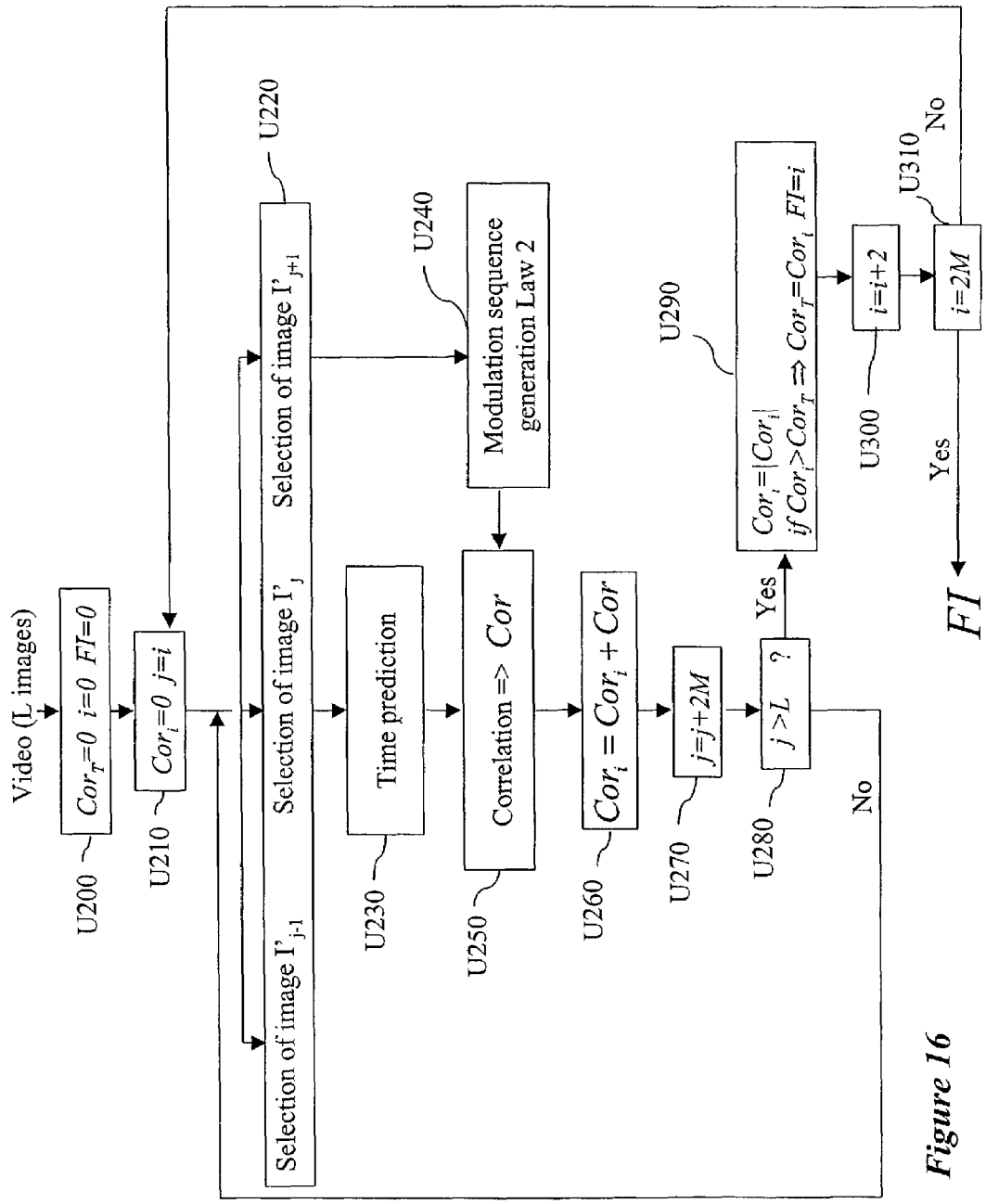
FIG. 16 shows an embodiment for detection of images in which the first symbol of the message has been inserted, included in the method of FIG. 14.

FIG. 16 is an embodiment of the step U11 of detecting the images in which the first message symbol has been inserted. This detection comprises the steps U200 to U310. It is assumed that the size L of the sequence and the size M of the message are known. It is assumed here that the result of step U10 is that the images of even index are the images in which a message symbol has been inserted.

The detection consists of searching to see if the images of indices (i+2.k.M), where k us a positive integer, contain the first bit of the message.

The step U200 is a setting operation at which three parameters i, $Cor_T$ and FI are set to the value 0. The parameter i represents the index of the current image. In the case where the images of odd index are the images in which a message symbol has been inserted, the parameter i is reset to 1. The parameter $Cor_T$ represents a measurement of total correlation. The parameter FI represents the index of the first image of the sequence in which the first bit of the message has been inserted.

The following step U210 is an initialization at which a parameter $Cor_i$ is set to the value 0 and a parameter j is set to the value i. The parameter $Cor_i$ represents a measurement of confidence in the fact that the image of index i contains the first bit of the message. The parameter j is a intermediate variable which represents the index of the current image in a processing loop which will be detailed below.

The following step U220 is the selection of the three images $I'_{j-1}$, $I'_j$ et $I'_{j+1}$ of the sequence VD'. When the image $I'_{j-1}$ does not exist, it is replaced by the image $I'_{j+1}$.

The following step U230 is a time prediction of the watermarking signal inserted in the image $I'_j$ of index j. For this, a predicted image $\hat{I}_j$ is calculated from the images $I'_{j-1}$ and $I'_{j+1}$. More particularly, a pixel $\hat{I}_j(p, q)$ of the predicted image $\hat{I}_i$ is calculated according to the following formula:

$$\hat{I}_j(p,q)=(I'_{j-1}(p,q)+I'_{j+1}(p,q))/2$$

The predicted image $\hat{I}_j$ is next subtracted from the current image $I'_j$. The result is an estimated watermarking signal $\tilde{W}$.

Step U240 is a calculation of the demodulation sequence W' from the image $I_{j+1}$ of index j+1. This step is analogous to the step U5B already described, i.e. the second law is used.

The steps U230 and U240 are followed by the step U250 which is a measurement of the correlation C between the predicted watermarking signal and the modulation sequence calculated according to the second law. The correlation measurement C is strong if the current image is an image in which the first bit of the message has been inserted. On the contrary, the correlation measurement C is weak if it is not the first bit of the message which has been inserted in the current image.

At the following step U260, the value Cor previously calculated is added to the quantity $Cor_i$.

The parameter j is incremented by the value 2.M at the following step U270, in order to consider the following image in which the same bit has been inserted.

The following step U280 is a test to determine whether the parameter j has reached the size L of the sequence. When the response is negative, step U280 is followed by the step U220 already described.

The processing loop carried out over the steps U220 to U280 makes it possible to go through the whole sequence in relation to a given bit inserted in it.

When the whole sequence has thus been run through, the response is positive at the step U280 and the latter is followed by step U290 at which the absolute value of the quantity $Cor_i$ is compared to the quantity $Cor_T$.

When it is established that the absolute value of the quantity $Cor_i$ is greater than the quantity $Cor_T$, this means that the images of indices i, i+2.M, i+4.M, etc. are probably images in which the first bit of the message has been inserted. The quantity $Cor_T$ is then set to the current value of the absolute value of the quantity $Cor_i$. The parameter FI is set to the current value i.

At the following step U300, the parameter i is incremented by two units in order to consider the following image in which a message bit has been inserted.

The following step U310 is a test to verify whether the parameter i is equal to 2.M. The parameter i successively takes the values between 0 and (2.M−2). With the insertion mode previously described, the images bearing a bit of the same index are necessarily separated by 2.M. So long as the response is negative, step U310 is followed by the step U210 already described.

When the response is positive, the index FI has been determined of the first image in which the first bit of the message has been inserted.

Figure 17:
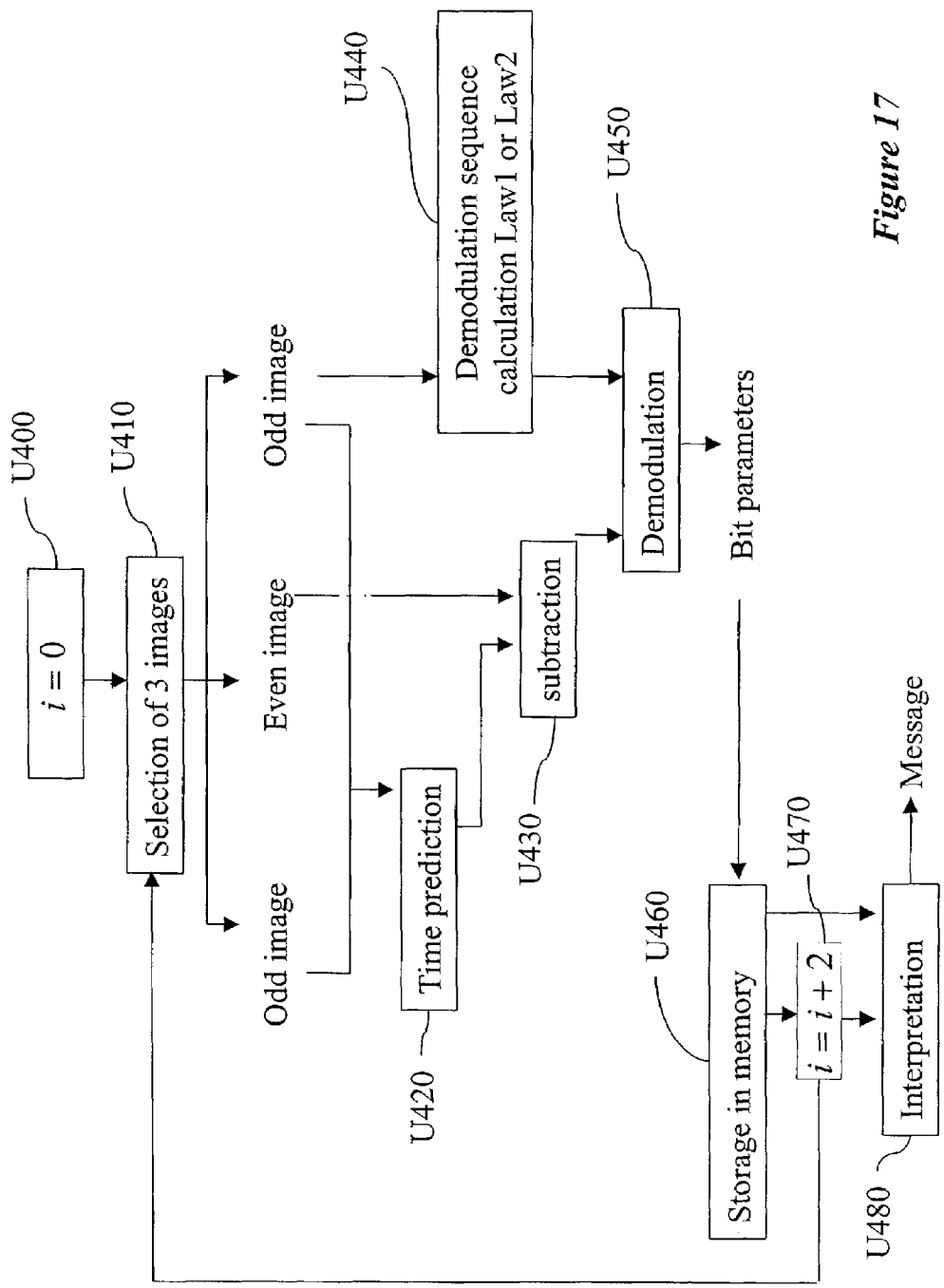
FIG. 17 shows an embodiment of message extraction, included in the method of FIG. 14.

FIG. 17 represents an embodiment of step U12 of extracting a message inserted previously in a sequence of images VD', according to the invention. This extraction comprises the steps S400 to U480.

Step U400 is an initialization at which a parameter i is set to the value 0. The parameter i represents the index of the current image. It is assumed here that the result of step U10 is that the images of even index are the images in which a message has been inserted. In the opposite case, the parameter i is initialized to 1.

The following step U410 is the selection of the three images $I'_{i-1}$, $I'_i$ and $I'_{i+1}$ of the sequence VD'. When the image $I'_{i-1}$ does not exist, it is replaced by the image $I'_{i+1}$.

The following step U420 is a time prediction of the image $I'_i$ of even index. A predicted image $\hat{I}_i$ is calculated from the images $I'_{i-1}$ and $I'_{i+1}$. More particularly, a pixel $\hat{I}_i(p, q)$ of the predicted image $\hat{I}_i$ is calculated according to the following formula:

$$\hat{I}_i(p,q)=(I'_{i-1}(p,q)+I'_{i+1}(p,q))/2$$

The following step U430 is the subtraction of the predicted image $\hat{I}_i$ from the current image $I'_i$. The result is an estimated watermarking signal $\tilde{W}$.

Step U440 is a calculation of the demodulation sequence W' from the image $I'_{i+1}$ of odd index. This calculation depends on the value of the current index i. When the index i is different from the quantity FI+2.k.M, with k being any integer and the parameter FI being determined at step U11, then the demodulation sequence is calculated with the first law, in a manner analog to the calculation of step U5A already described.

When the index i is equal to the quantity FI+2.k.M, with k being any integer, then the demodulation sequence is calculated with the second law, in a manner analog to the calculation of step U5B already described.

The steps U430 and U440 are followed by the step U450 which is the demodulation of the estimated watermarking signal in order to deduct the bit which had been inserted in the current image.

For this four parameters are calculated:

$$S_+ = \sum_{(p,q)} \tilde{W}(p, q) * F_{W'(p,q)>0}$$

$$N_+ = \sum_{(p,q)} F_{W'(p,q)>0}$$

$$S_- = \sum_{(p,q)} \tilde{W}(p, q) * F_{W'(p,q)<0}$$

$$N_- = \sum_{(p,q)} F_{W'(p,q)<0}$$

The value of the function $F_{condition}$ is 1 if the condition is true and 0 otherwise.

At the following step U460, a sum of each of these parameters is calculated by adding them respectively to the parameters already calculated for the same current bit. For example, for the bit $b_m$, the values $S_+$, $S_-$, $N_+$, $N_-$ are added to the values connected to the bit $b_m$ and previously stored in memory. We therefore have:

$$S^m_+ = S^m_+ + S_+,$$

$$S^m_- = S^m_- + S_-,$$

$$N^m_+ = N^m_+ + N_+ \text{ and}$$

$$N^m_- = N^m_- + N_-.$$

The values $S^m_+$, $S^m_-$, $N^m_+$ and $N^m_-$ are initialized to 0 at the start of the extraction algorithm.

It should be noted that, as the images bearing the first bit of the message have been detected at step U11, the index m of the bit inserted in an image of any index i is known.

Step U460 is followed by the step U470 at which the parameter i is incremented by two units in order to consider a following image of even index. Step U470 is then followed by the previously described step U410.

When all the images of the sequence have been processed, step U460 is followed by the step U480 which is the interpretation of the parameters of each bit.

For each bit $b_m$, the difference of average $D=(S^m_+/N^m_+)-(S^m_-/N^m_-)$ is calculated. If the difference D is positive, then the bit is equal to 1. If the difference D is negative, then the bit is equal to 0. It should be noted that this manner of decoding the bits inserted in the sequence of images may be replaced by any other measurement of correlation between the demodulation sequence W' generated at step U440 and the sequence connected to the bit inserted generated at step U430.

The extracted message is then decoded. For example, if it is known that it is composed of ASCII characters, the extracted bits are grouped together in groups of eight bits, and one ASCII character is associated with each group.

Step U470 may possibly be followed by the step U480 which enables the interpretation to be made of the data collected before the total processing of the video sequence. This intermediate interpretation enables the message inserted in the video to be known more rapidly.

Figure 18:
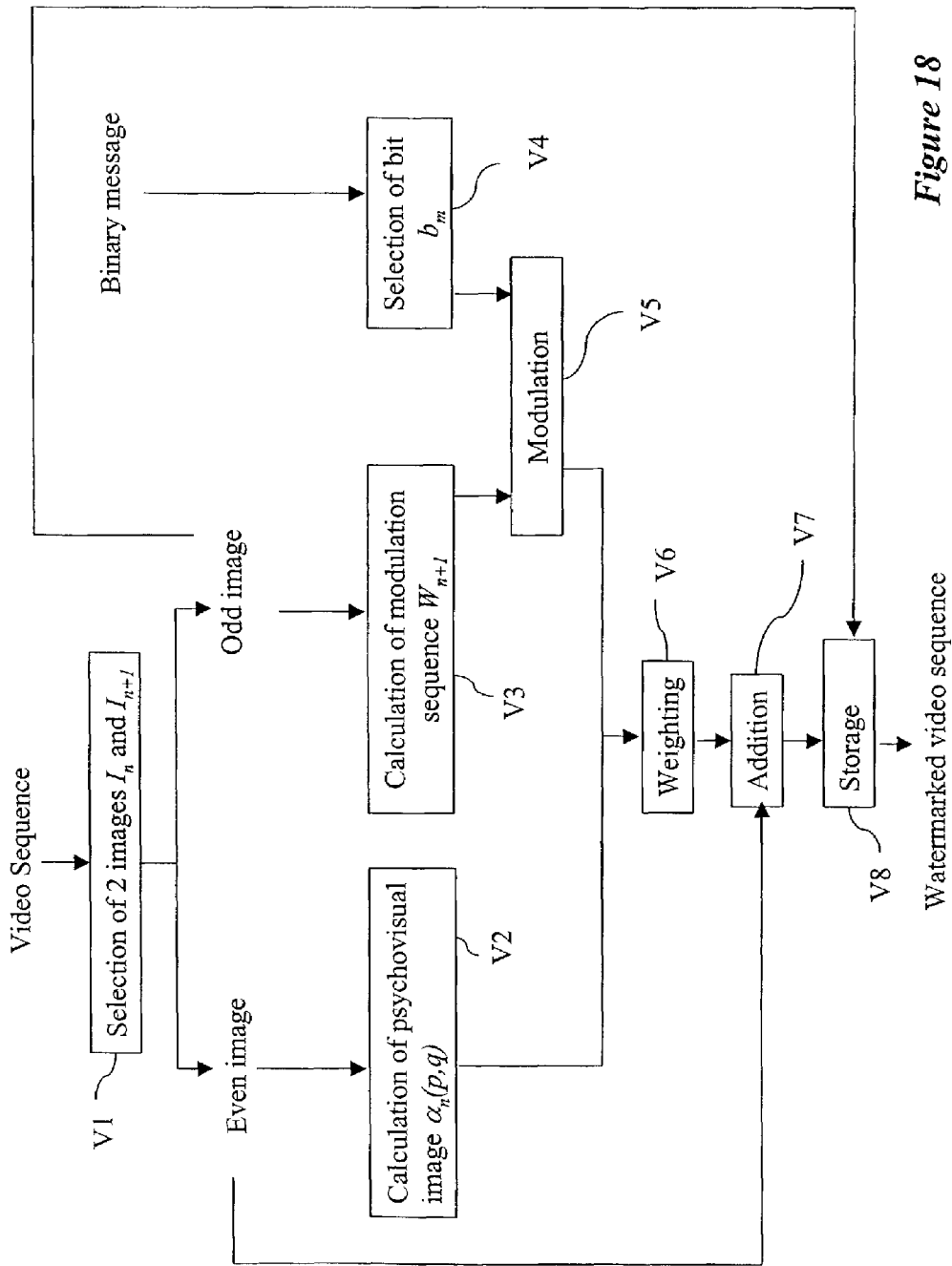
FIG. 18 is an embodiment of a method of message insertion in a sequence of images according to the fourth aspect of the invention.

FIG. 18 shows an embodiment of a method of message insertion in a sequence of images according to the fourth aspect of the invention. This method is implemented in the insertion device and comprises the steps V1 to V8.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

The method is described with respect to two images. It is reiterated for all the images of the sequence.

Step V1 is the selection of two images $I_n$ and $I_{n+1}$ in the sequence. One of them is the image in which a symbol insertion will be carried out and the other serves to generate a modulation sequence used for the insertion.

In this embodiment, the insertion is carried out on an image of even index and the following image, of odd index, serves to generate the modulation sequence. Of course, the insertion of the symbols of the message can be carried out on the images of odd index, and the images of even index are then unchanged.

The insertion can equally be carried out on one image out of every three, or out of every four, instead of one image out of two.

The image $I_n$ of even index is used at the step V2 to calculate a psycho-visual model on that image. This model is calculated in known manner, not detailed here. For any pixel $I_n(p, q)$ of this image, the maximum modification $\alpha_n(p, q)$ is determined that the pixel can undergo without this modification being visible. The result is a set of weighting factors.

The image $I_{n+1}$ of odd index is used at step V3 to generate a modulation sequence $w_{n+1}$. This step will be detailed below. The modulation sequence has the same size as the images of the sequence and its coefficients can take two values: −1 and +1.

A bit $b_m$ of the binary message to be inserted is selected at the step V4. The selection of a bit $b_m$ is for example carried out as a function of the index n of the current image $I_n$ in which it is inserted. FIG. 8 is an example of bit selection for insertion. The video sequence comprises eight images $I_0$ to $I_7$ and the message comprises three bits $b_0$, $b_1$ and $b_2$. A bit $b_m$ is inserted in the image $I_n$ on condition that the integer m is equal to the remainder of the integer division of n/2 by the number of bits of the message to insert. If the value of the bit to insert is 0, it is changed into −1.

Steps V3 and V4 are followed by step V5 at which the bit $b_m$ to be inserted is modulated by the modulation sequence generated at step V3. The result is a second modulation sequence: $W_{n+1}=b_m \cdot w_{n+1}$. A coefficient $W_{n+1}(p, q)$ of this modulation sequence is determined by the formula: $W_{n+1}(p, q)=b_m \cdot w_{n+1}(p, q)$.

Steps V2 and V5 are followed by the step V6 at which the weighting factors $\alpha_n(p, q)$ determined at step V2 are applied to the second modulation sequence. The result is a third sequence which has maximum energy while remaining invisible after insertion in the image.

The following step V7 is the insertion of the third sequence in the image of even index. The result is an image $I'_n$ of which the pixels are determined by the formula: $I'_n(p, q)=I_n(p, q)+\alpha_n(p, q) \cdot b_m \cdot w_{n+1}(p, q)$.

The following step V8 is the storage of the image $I'_n$ in which the bit has been inserted and the image $I_{n+1}$ of odd index.

When all the images of the sequence have been processed, then the new sequence VD' in which the message has been inserted is entirely formed. This sequence comprises images of odd index which are identical to the images of odd index of the initial sequence VD and images of even index in which bits have been inserted.

Figure 19:
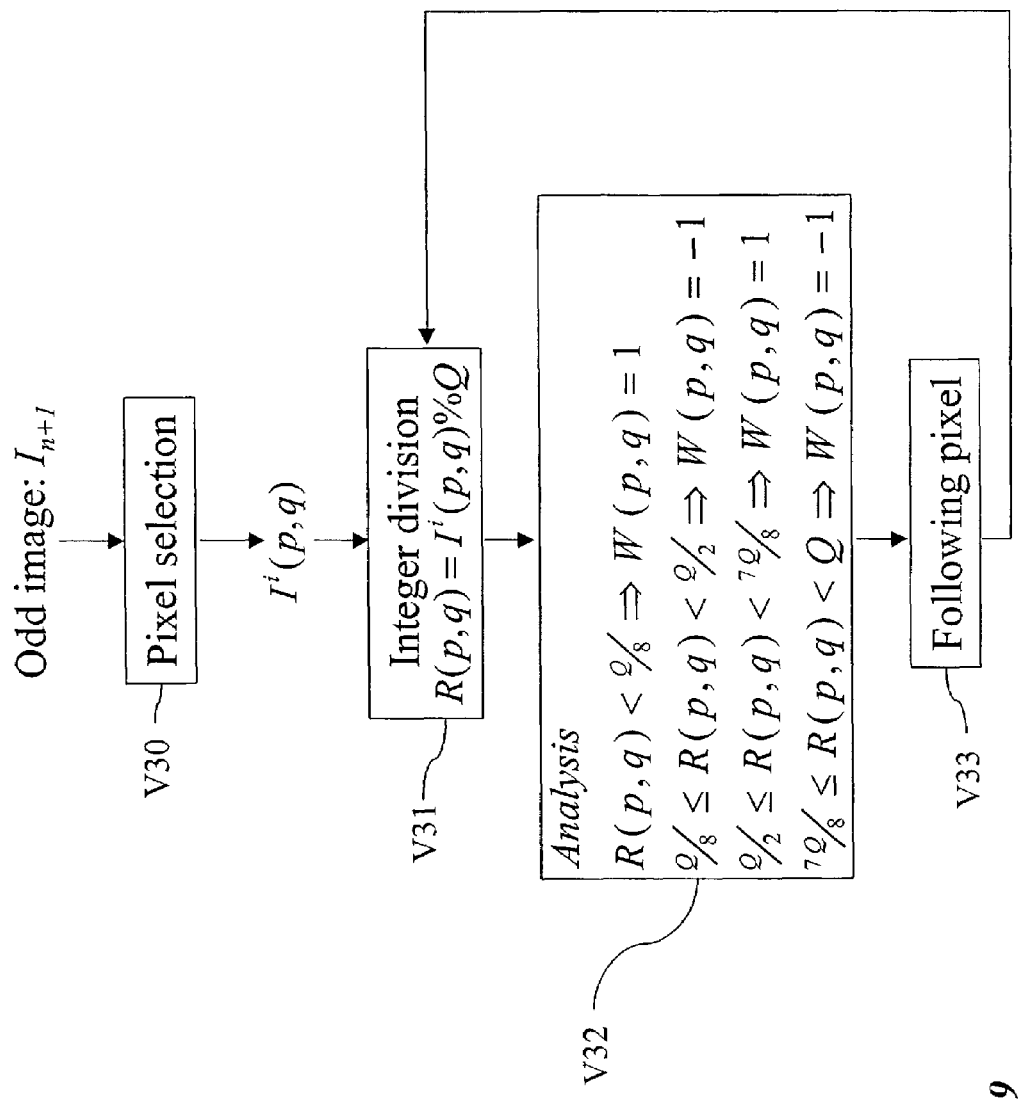
FIG. 19 shows a modulation sequence calculation included in the method of FIG. 18.

FIG. 19 represents an embodiment of the step V3 of calculating the modulation sequence $w_{n+1}$ from the current image $I_{n+1}$ of odd index. The calculation comprises the steps V30 to V33.

The step V30 is the selection of a pixel of the image. The image is processed pixel by pixel. At least one component of each pixel is considered. According to the representation mode of the pixels, this component concerns the luminance or the chrominance or one of the colors red, green or blue. In what follows, the luminance component $I_i(p, q)$ of the current pixel is considered.

The following step V31 is the integer division of the value of the luminance component $I_i(p, q)$ of the current pixel by a value Q, for example equal to 16.

The value Q is determined experimentally as a function of a compromise between the invisibility of the inserted message and the robustness of the compression. More particularly, if the value of Q is too high, the modulation sequences generated may have significant low-pass frequency characteristics. Their insertion could therefore be visible.

Conversely, if the value of Q is too small, the invisibility of the modulation sequence is better, but the robustness of the compression is low. A slight modification of the image serving to generate the demodulation sequence will prevent the generation of a demodulation sequence close to the modulation sequence.

This division has a remainder R(p, q) which is analyzed at the following step V32. At this step, the remainder R (p, q) is compared to the value Q/8, Q/2 and 7Q/8.

When the remainder R(p, q) is less than Q/8, then a coefficient $w_{n+1}(p, q)$ of the modulation sequence is set to the value 1.

When the remainder R(p, q) is greater than or equal to Q/8 and less than Q/2, then a coefficient $w_{n+1}(p, q)$ of the modulation sequence is set to the value −1.

When the remainder R(p, q) is greater than or equal to Q/2 and less than 7Q/8, then a coefficient $w_{n+1}(p, q)$ of the modulation sequence is set to the value 1.

Finally, when the remainder R(p, q) is greater than or equal to 7Q/8 and less than Q, then a coefficient $w_{n+1}(p, q)$ of the modulation sequence is set to the value −1.

Thus, the modulation sequence generation law satisfies the following property:

if a large number of pixels have a luminance value such that the remainder of their integer division by the quantity Q follows a uniform probability law over the segment [0, Q[, then these pixels generate a first modulation sequence, and if the luminance of these pixels is modified by any modification value, the modified pixels generate a second modulation sequence, thus the correlation of the two modulation sequences only has a maximum if the modification value is a multiple of the value Q.

This property will make it possible to compensate for the changes of luminance of the video signal in which the message was inserted.

Figure 20:
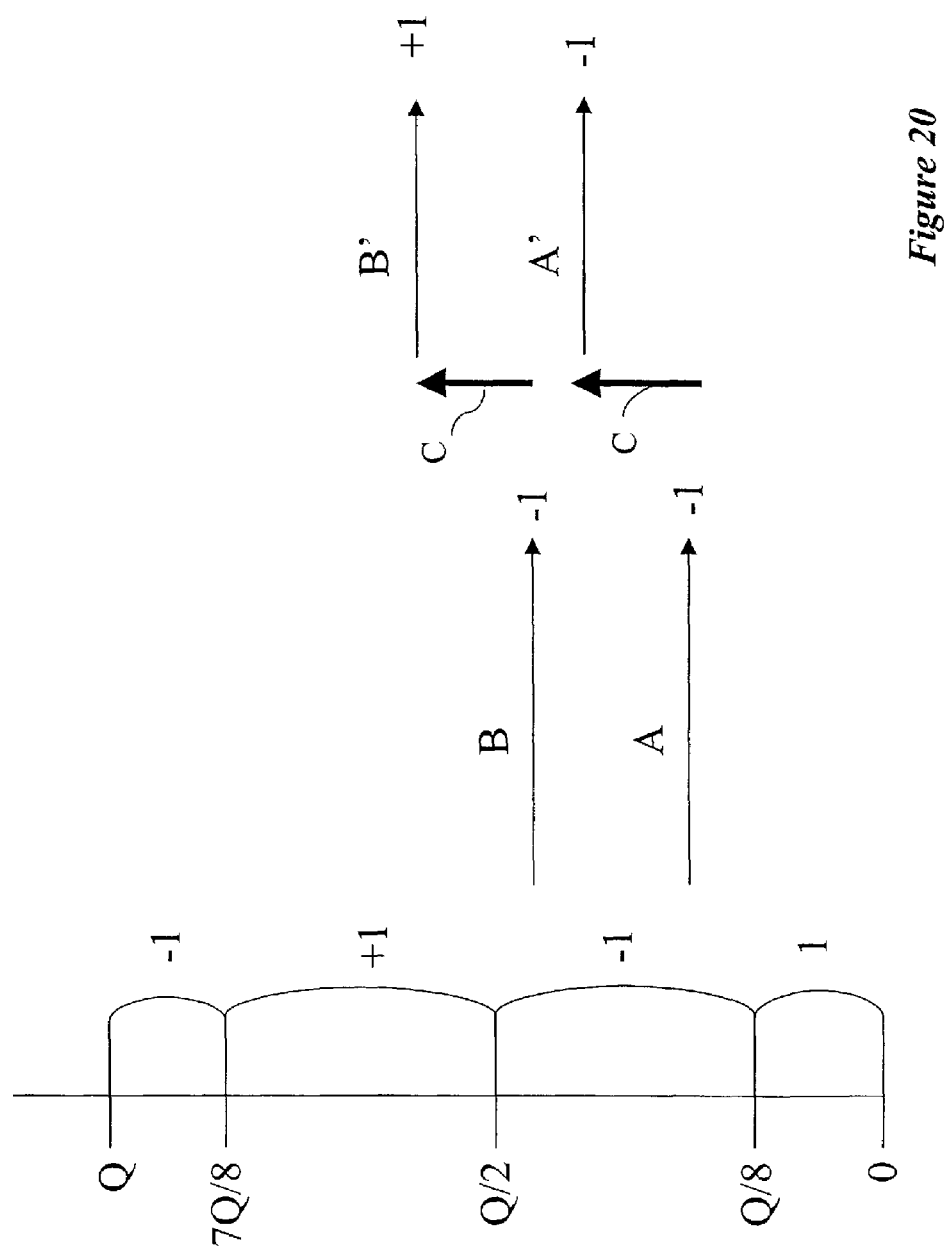
FIG. 20 represents a modulation sequence generation law according to the fourth aspect of the invention.

FIG. 20 represents the effect of a change in the luminance of the video signal in which a message has been inserted.

The modulation sequence generation law is shown by the scale 50. Two pixels A and B of an image of odd index have respective values between Q/8 and Q/2.

It is assumed that the luminance of the video sequence in which the message was inserted has been increased by the value C. The new value of the pixel A is A'=A+C and the new value of the pixel B is B'=B+C. The value A' is between Q/8 and Q/2 and the value B' is between Q/2 and 7Q/8.

If, on extraction, a demodulation sequence is generated from the pixels A' and B', it will be different from the modulation sequence generated from the pixels A and B.

Thus, in the context of the invention, on extraction, which will be described below, the variation in luminance will be estimated and compensated for, in order to generate the correct demodulation sequence, then the inserted message will be extracted from the sequence of images.

Referring again to FIG. 19, step V32 is followed by the step V33 at which the following pixel is considered, so long as all the pixels of the current image have not been processed. Step V33 is then followed by the previously described step V31.

When all the pixels have been processed, the modulation sequence has been completely defined and the step V33 is followed by the step V4 already described.

Figure 21:
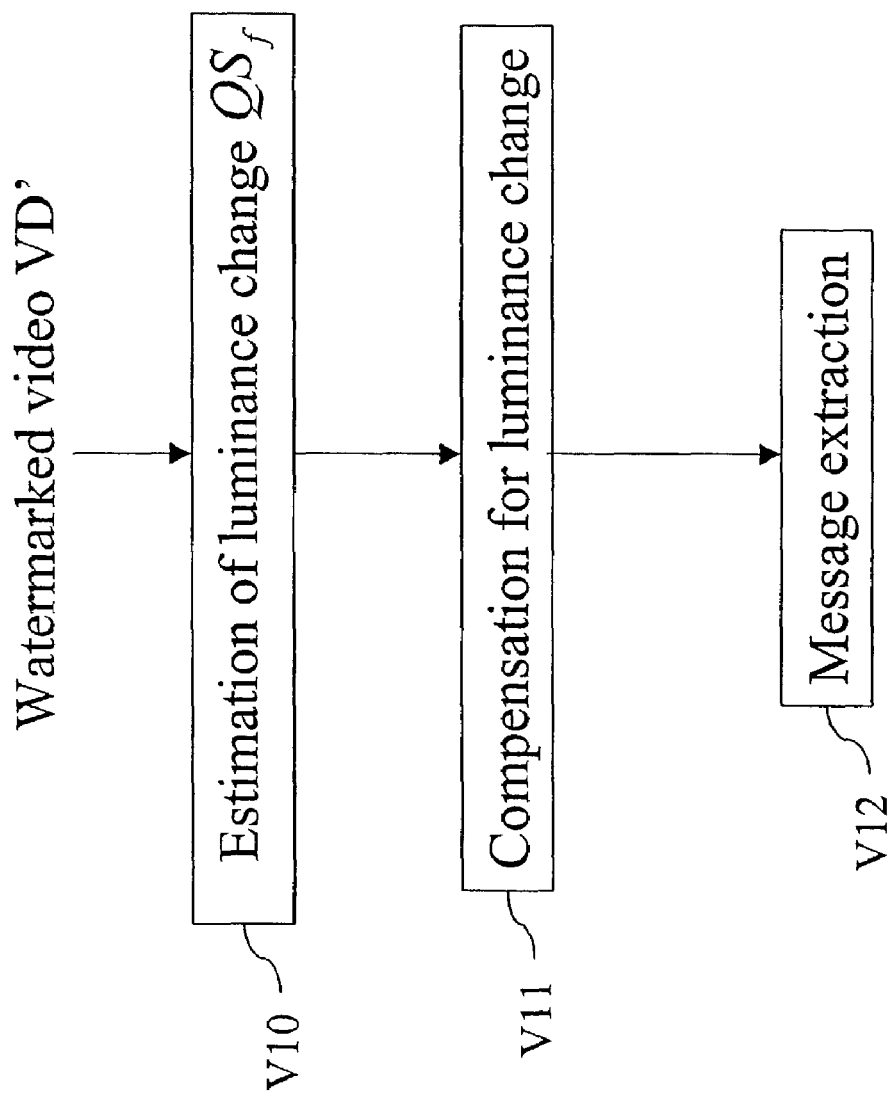
FIG. 21 is an embodiment of a method of message extraction from a sequence of images according to the fourth aspect invention.

FIG. 21 represents an embodiment of a method of extracting a message inserted previously in a sequence of images VD', according to the fourth aspect of the invention. This method is implemented in an extraction device and comprises steps V10 to V12.

This sequence of images can be either directly the sequence of images obtained after insertion of a message (result of the method of FIG. 18) or else a modified version of that sequence. These modifications may, for example, be a compression followed by a decompression and/or a geometrical distortion. The sequence of images VD' comprises images $I'_0$ à $I'_M$.

Furthermore, a change in luminance may have been applied to the sequence VD'.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step V10 is an estimation of a change in luminance of the video sequence. This step will be detailed below. The estimation of the change in luminance is carried out on N images of the sequence. The number N can be equal to the number M of images in the sequence VD' if the change in luminance is assumed to be uniform over all the images of the sequence.

Conversely, if it is assumed that the change in luminance is not uniform over the sequence VD', number N is small with respect to the number M, and the change in luminance may be estimated successively by several groups of N images in the sequence.

The following step V11 is a compensation for the estimated change in luminance. The video sequence in which the message was inserted is modified pixel by pixel to compensate for the change in luminance.

The compensation consists in adding an estimation of the change in luminance to the luminance component of each pixel. In this embodiment, this operation is only necessary for images serving as reference images, here the images of odd index. However, the compensation is applied over the whole of the video sequence.

If the estimated change in luminance is uniform over the entire video sequence, then the compensation is too. Conversely, if the change in luminance is determined image group by image group, the compensation is applied in the same manner.

The following step V12 is the extraction of the message. This step will be detailed below.

Figure 22:
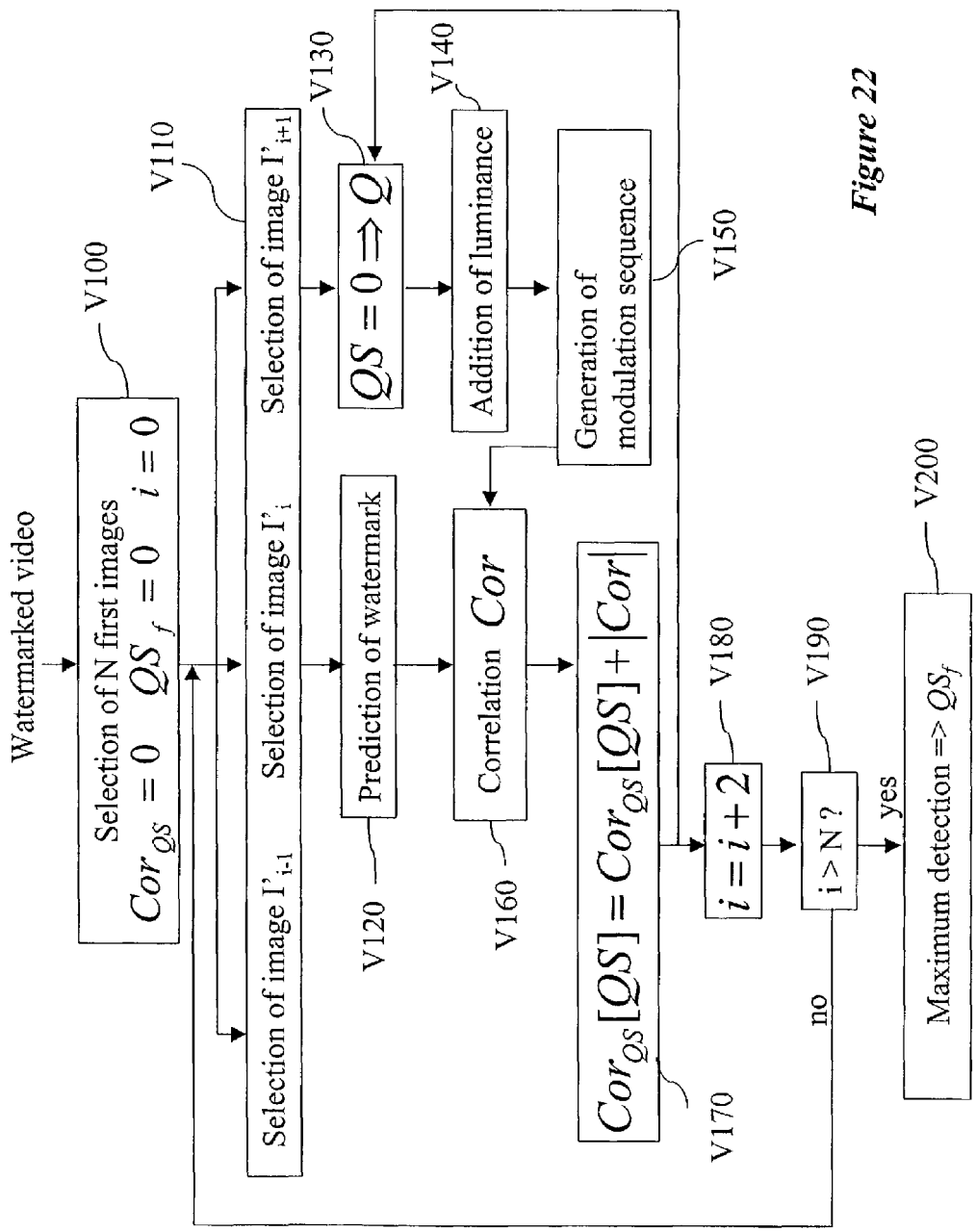
FIG. 22 shows an embodiment of a method of estimating luminance change in a sequence of images, included in the method of FIG. 21.

FIG. 22 is an embodiment of step V10 of estimating the change in luminance. This estimation comprises the steps V100 to V200.

Step V100 is an initialization at which N images of the sequence are considered, where N is an integer. Here the first N images of the sequence are used, but it is possible to select N images spread over different zones of the sequence.

At this step the parameters $Cor_{QS}$, $QS_f$ and i are also initialized to 0. The parameters $Cor_{QS}$ represent respectively a measurement of confidence linked to each change in luminance QS tested. The number of parameters $Cor_{QS}$ depends on a quantization step size. For example, if the quantization step size is equal to 1, then Q parameters $Cor_{QS}$ are considered. The parameter $QS_f$ is the change in luminance determined at the end of the estimation. It corresponds to the value of change in luminance tested having the highest confidence measurement. The parameter i represents the index of the current image.

The following step V110 is the selection of the three images $I'_{i-1}$, $I'_i$ and $I'_{i+1}$ of the sequence VD'. When the image $I'_{i-1}$, does not exist, it is replaced by the image $I'_{i+1}$.

The following step V120 is a time prediction of the watermarking signal inserted in the image $I'_i$ of index i. For this, a predicted image $\hat{I}_i$ is calculated from the images $I'_{i-1}$ and $I'_{i+1}$. More particularly, a pixel $\hat{I}_i(p, q)$ of the predicted image $\hat{I}_i$ is calculated according to the following formula:

$$\hat{I}_i(p,q)=(I'_{i-1}(p,q)+I'_{i+1}(p,q))/2$$

The predicted image $\hat{I}_i$ is next subtracted from the current image $I'_i$. The result is an estimated watermarking signal $\hat{W}$.

It should be noted that this time prediction of the watermarking signal does not vary with a possible change of luminance applied to the video sequence containing the image $I_i$.

At step V130, a parameter QS representing a value of luminance change is considered. This parameter will take successive values between 0 and Q, according to a predetermined quantization step size.

The following step V140 is the addition of the current value of the parameter QS to the luminance of the current odd image $I_{i+1}$.

The following step V150 is a modulation sequence generation, from the current image of odd index modified at the preceding step. The calculation is similar to that of step V3.

The steps V120 and V150 are followed by the step V160 at which a measurement of the correlation between the estimated watermarking signal and the current modulation sequence is carried out.

At the following step V170, the absolute value of the correlation calculated earlier for the current parameter QS is added to the current value $Cor_{QS}$ corresponding to this parameter and the accumulated value is stored in memory.

Steps V130 to V170 are reiterated for all the values of the parameter QS between 0 and Q.

Next, step V170 is followed by the step V180 at which the parameter i is incremented by two units in order to consider a following image of even index.

The following step V190 is a test to determine if the parameter i is greater than N. If the response is negative, this step is followed by the step S110 already described.

When the response is positive, all the first N images have been processed. Step V190 is then followed by step V200 at which the maximum value of the accumulated amounts $Cor_{QS}$ gives an estimation $QS_f$ of the change of luminance.

It is this value which is added to the component of luminance of each pixel of the images.

Figure 23:
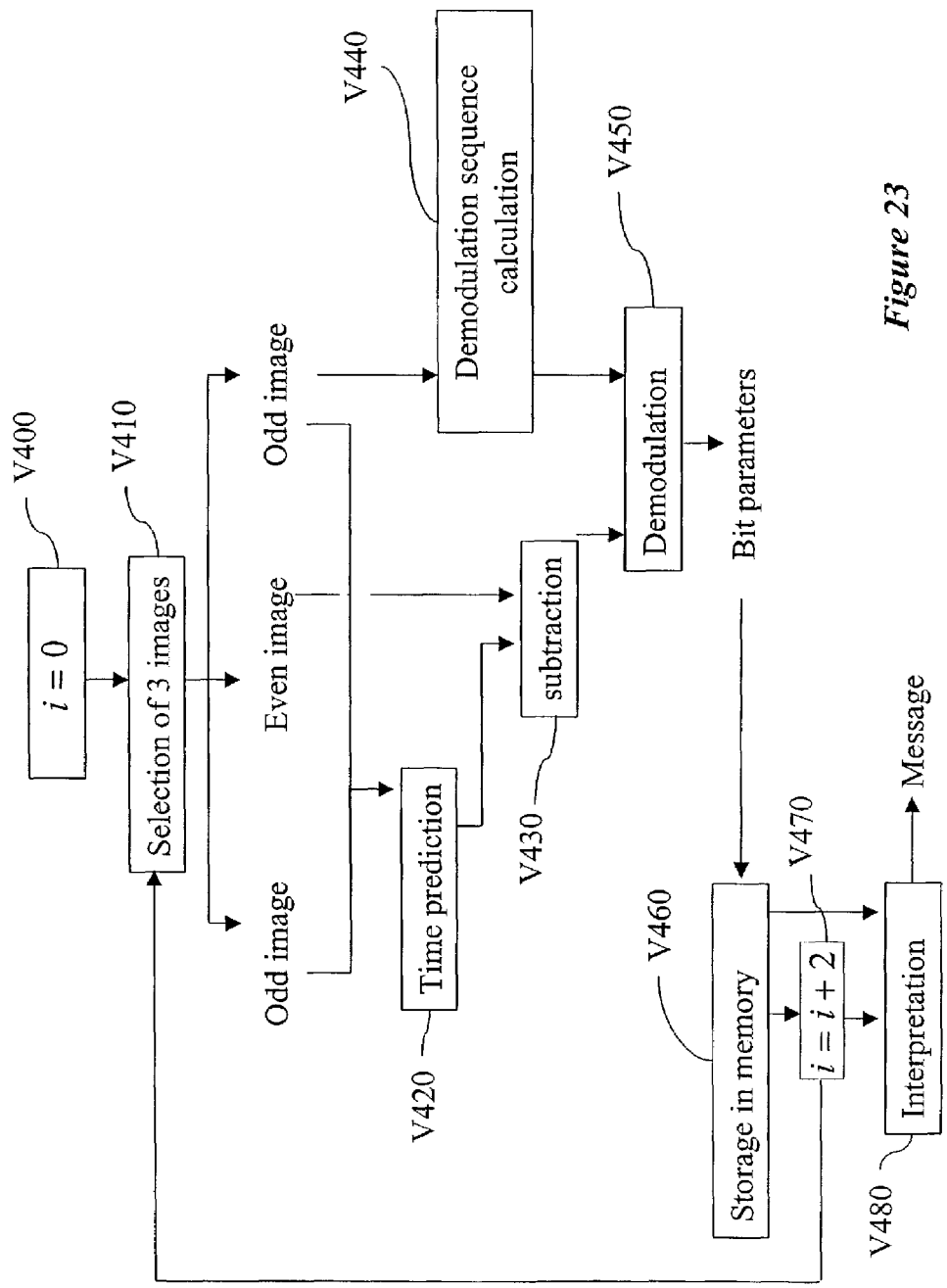
FIG. 23 shows an embodiment of message extraction, included in the method of FIG. 21.
Figure 24:
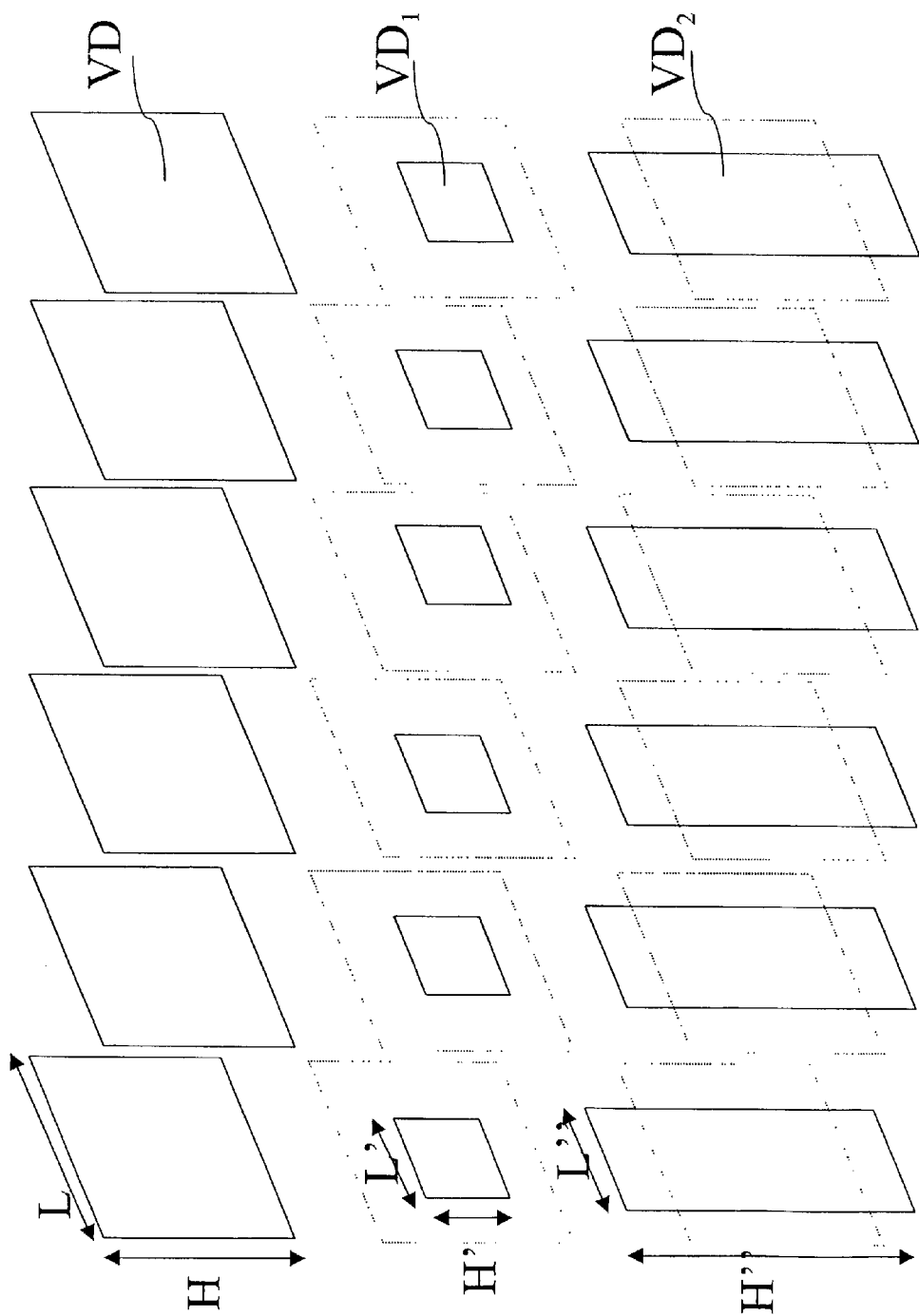
FIG. 24 shows examples of transformations of digital sequences of images.

FIG. 23 represents an embodiment of step V12 of extracting a message inserted previously in a sequence of images VD', according to the invention. This extraction comprises the steps V400 to V480.

Step V400 is an initialization at which a parameter i is set to the value 0. The parameter i represents the index of the current image.

The following step V410 is the selection of the three images $I'_{i-1}$, $I'_i$ and $I'_{i+1}$ of the sequence VD'. When the image $I'_{i-1}$ does not exist, it is replaced by the image $I'_{i+1}$.

The following step V420 is a time prediction of the image $I'_i$ of even index. A predicted image $\hat{I}_i$ is calculated from the images $I'_{i-1}$ and $I'_{i+1}$. More particularly, a pixel $\hat{I}_i(p, q)$ of the predicted image $\hat{I}_i$ is calculated according to the following formula:

$$\hat{I}_i(p,q) = (I'_{i-1}(p,q) + I'_{i+1}(p,q))/2$$

The following step V430 is the subtraction of the predicted image $\hat{I}_i$ from the current image $I'_i$. The result is an estimated watermarking signal $\tilde{W}$.

Step V440 is a calculation of demodulation sequence W' from the image $I_{i+1}$ of odd index. This step is analogous to the step V3 already described.

The steps V430 and V440 are followed by the step V450 which is the demodulation of the estimated watermarking signal in order to deduct the bit which had been inserted in the current image.

For this four parameters are calculated:

$$S_+ = \sum_{(p,q)} \tilde{W}(p, q) * F_{W'(p,q)>0}$$

$$N_+ = \sum_{(p,q)} F_{W'(p,q)>0}$$

$$S_- = \sum_{(p,q)} \tilde{W}(p, q) * F_{W'(p,q)<0}$$

$$N_- = \sum_{(p,q)} F_{W'(p,q)<0}$$

The value of the function $F_{condition}$ is 1 if the condition is true and 0 otherwise.

At the following step V460, a sum of each of these parameters is calculated by adding them respectively to the parameters already calculated for the same current bit. Indeed, the mode of inserting the bits in the images being known, the index of the bit corresponding to the current image is known.

For example, for the bit $b_m$, the values $S_+$, $S_-$, $N_+$, $N_-$ are added to the values connected to the bit $b_m$ and previously stored in memory. We therefore have:

$$S^m_+ = S^m_+ + S_+,$$

$$S^m_- = S^m_- + S_-,$$

$$N^m_+ = N^m_+ + N_+ \text{ and}$$

$$N^m_- = N^m_- + N_-.$$

The values $S^m_+$, $S^m_-$, $N^m_+$ and $N^m_-$ are initialized to 0 at the start of the extraction algorithm.

Step V460 is followed by the step V470 at which the parameter i is incremented by two units in order to consider a following image of even index. Step V470 is then followed by the previously described step V410.

When all the images of the sequence have been processed, step V460 is followed by the step V480 which is the interpretation of the parameters of each bit.

For each bit $b_m$, the difference of average $D = (S^m_+/N^m_+) - (S^m_-/N^m_-)$ is calculated. If the difference D is positive, then the bit is equal to 1. If the difference D is negative, then the bit is equal to 0. It should be noted that this manner of decoding the bits inserted in the sequence of images may be replaced by any other measurement of correlation between the demodulation sequence W' generated at step V440 and the sequence connected to the bit inserted generated at step V430.

The extracted message is then decoded. For example, if it is known that it is composed of ASCII characters, the extracted bits are grouped together in groups of eight bits, and one ASCII character is associated with each group.

Step V470 may possibly be followed by the step V480 which enables the interpretation to be made of the data collected before the total processing of the video sequence. This intermediate interpretation enables the message inserted in the video to be known more rapidly.

Of course, the present invention is in no way limited to the embodiments described and represented, but encompasses, on the contrary, any variant form within the capability of the person skilled in the art.

The invention claimed is:

1. A method of extracting a message from a sequence of images in which the message has been inserted by insertion, in the spatial domain, of at least one symbol of the message in at least one part of an image, the image being bounded between two images in which no insertion is carried out by the insertion method in their respective parts in spatial correspondence with the at least one part, wherein the method of extracting comprises, for an image part in which at least one symbol has been inserted, the steps of:
   predicting the current image part from the respective spatially corresponding parts of the two images bounding it,
   subtracting the part of the image predicted from the part of the image in which at least one symbol has been inserted, and
   extracting the at least one symbol from the result of the subtraction.

2. A method according to claim 1, wherein the prediction of the current image part is performed by a calculation of the mean of the respective spatially corresponding parts of the two images bounding it.

3. A method according to claim 1, wherein the prediction of the current image part is performed by a calculation of the movement between the current image part and the respective spatially corresponding parts of the two images bounding it.

4. A method according to claim 1, wherein, at the subtraction step, only the values resulting from the subtraction which are less than a predetermined threshold are kept.

5. A method according to claim 1, wherein the extraction comprises a calculation of correlation between the result of the subtraction and the pseudo-random sequence used at the time of the insertion.

6. A method of inserting a message in a sequence of digital images, comprising, for each current image in which a symbol of the message is to be inserted, the steps of:
   determining a modulation sequence from a reference image included in the sequence of images and different from the current image.

modulating the symbol to be inserted by the determined modulation sequence, and inserting the modulated symbol in the current image, wherein the insertion is carried out in one image out of every two, wherein the determination of a modulation sequence comprises:

performing integer division of the value of a predetermined component of each pixel of the reference image, by a first predetermined value, comparing the remainder of the integer division with a second predetermined value, for each integer division, and determining the value of each coefficient of the modulation sequence, depending on the respective result of each comparison.

7. A method according to claim 6, wherein the predetermined component is the luminance.

8. A method of inserting a message in a sequence of images, the message comprising ordered symbols, comprising, for each image in which a symbol of the message is to be inserted, the steps of:

determining a first modulation sequence from a reference image included in the sequence of images, according to a first law, if the order of the symbol is different from a predetermined order, determining a second modulation sequence from a reference image included in the sequence of images, according to a second law, if the order of the symbol is equal to the predetermined order, wherein the second modulation sequence determined according to the second law is different from the first modulation sequence determined according to the first law, modulating the symbol to be inserted by the determined modulation sequence, and inserting the modulated symbol in the current image.

9. A method according to claim 8, wherein the first and second sequences are such that the result of the correlation of the first sequence by the second sequence is negligible in relation to the result of the correlation of the first sequence by itself or of the second sequence by itself.

10. A method according to claim 8, wherein the reference image is the image following the current image in the sequence.

11. A method according to claim 8, wherein the insertion is carried out on one image out of every two.

12. A method according to claim 8, wherein the determination of a modulation sequence comprises:

performing integer division of a quantity dependent on the value of a predetermined component of each pixel of the reference image, by a first predetermined value, comparing the remainder of the integer division with a second predetermined value, for each integer division, and determining the value of each coefficient of the modulation sequence, depending on the respective result of each comparison.

13. A method according to claim 12, wherein the predetermined component is the luminance.

14. A method according to claim 8, wherein the predetermined order is that of the first symbol of the message.

15. A method of extracting a message from a sequence of images in which the message has been inserted by the method of insertion according to claim 8, comprising the steps of:

detecting the images in which the symbol of predetermined order has been inserted, among the images in which a message symbol has been inserted, and extracting the inserted message.

16. A method of extraction according to claim 15, further comprising the prior step of detecting the images in which a message symbol has been inserted.

17. A method of extraction according to claim 16, wherein the detection of the images in which a symbol has been inserted comprises, for an image:

estimating the watermarking signal of the inserted symbol, determining a demodulation sequence from a reference image, according to the first law, measuring a correlation between the estimated watermarking signal and the demodulation sequence, and determining the images for which the correlation measurement is maximum.

18. A method of extraction according to claim 15, wherein the detection of the images in which the symbol of predetermined order has been inserted comprises, for an image in which a symbol has been inserted:

estimating the watermarking signal of the inserted symbol, determining a demodulation sequence from a reference image, according to the second law, measuring a correlation between the estimated watermarking signal and the demodulation sequence, and determining the images for which the correlation measurement is maximum.

19. A method of extraction according to claim 15, further comprising, for an image in which a symbol has been inserted, the steps of:

estimating the watermarking signal of the inserted symbol, determining a demodulation sequence from a reference image, according to a first or second law, depending on the order of the symbol, and demodulating the estimated watermarking signal with the demodulation sequence.

20. A method of inserting a message in a sequence of images, the images comprising pixels represented by components, comprising, for each image in which a symbol of the message is to be inserted, the steps of:

determining a modulation sequence from a reference image included in the sequence of images, according to a periodic law of predetermined period, said law being such that, if a correlation were measured between the modulation sequence and a second modulation sequence determined according to the same law and from the same reference image, in which the values of a predetermined component of the pixels have been modified, and if the absolute values of the measured correlation values were plotted on a graph, the graph would have only one maximum value over the predetermined period, modulating the symbol to be inserted by the determined modulation sequence, and inserting the modulated symbol in the current image.

21. A method according to claim 20, wherein the reference image is the image following the current image in the sequence.

22. A method according to claim 20, wherein the insertion is carried out in one image out of every two.

23. A method according to claim 20, wherein the determination of a modulation sequence comprises:

performing integer division of the value of the predetermined component of each pixel of the reference image, by a first predetermined value, comparing the remainder of the integer division with a set of second predetermined values, for each integer division, and determining the value of each coefficient of the modulation sequence, depending on the respective result of each comparison.

24. A method according to claim 20, wherein the predetermined component is the luminance.

25. A method of extracting a message from a sequence of images in which the message has been inserted by the method of insertion according to claim 20, comprising the steps of:

estimating a modification of the values of the predetermined component of the pixels of the reference image, for each image in which a symbol has been inserted, compensating for the estimated modification, for each image in which a symbol has been inserted, and extracting the inserted message.

26. An extraction method according to claim 25, wherein the estimation of a modification of the values of the predetermined component of the pixels of the reference image comprises:

estimating the watermarking signal of the inserted symbol, determining a demodulation sequence from a reference image in which the values of the predetermined component of the pixels have been modified, measuring a correlation between the estimated watermarking signal and the demodulation sequence, and determining a modification value for which the correlation measurement is maximum.

27. An extraction method according to claim 25, wherein the compensation comprises adding the estimated modification to the value of the predetermined component of each pixel of the reference image.

28. A method of extraction according to claim 25, wherein the extraction comprises, for an image in which a symbol has been inserted, the steps of:

estimating the watermarking signal of the inserted symbol, determining a demodulation sequence from a reference image, in which the values of the predetermined component of the pixels have been modified by the estimated modification, and demodulating the estimated watermarking signal with the demodulation sequence.

29. A device for extracting a message from a sequence of images in which the message has been inserted by an insertion device comprising means for inserting, in the spatial domain, at least one symbol of the message in at least one part of an image, the image being bounded between two images in which no insertion is carried out by the insertion device in their respective parts in spatial correspondence with the at least one part, the device for extracting comprising, for an image part in which at least one symbol has been inserted:

means for predicting the current image part from the respective spatially corresponding parts of the two images bounding it, means for subtracting the part of the image predicted from the part of the image in which at least one symbol has been inserted, and means for extracting the at least one symbol from the result of the subtraction.

30. A device according to claim 29, wherein the means for predicting the current image part is adapted to perform the prediction by a calculation of the mean of the respective spatially corresponding parts of the two images bounding it.

31. A device according to claim 29, wherein the means for predicting the current image part is adapted to perform the prediction by a calculation of the movement between the current image part and the respective spatially corresponding parts of the two images bounding it.

32. A device according to claim 29, wherein the subtraction means is adapted to keep only the values resulting from the subtraction which are less than a predetermined threshold.

33. A device according to claim 29, wherein the extraction means is adapted to perform a calculation of correlation between the result of the subtraction and the pseudo-random sequence used at the time of the insertion.

34. An extraction device according to claim 29, wherein the means for prediction, subtraction and extraction are incorporated in:

a microprocessor, a read only memory, comprising a program for processing the data, and a random access memory comprising registers adapted to record variables modified during the execution of said program.

35. A device for processing a digital image, comprising a device according to claim 29.

36. A device for the insertion of a message in a sequence of digital images, comprising:

means for determining for each current image a modulation sequence from a reference image included in the sequence of images and different from the current image, for each image in which a symbol of the message is to be inserted, means for modulating the symbol to be inserted by the determined modulation sequence, and means for inserting the modulated symbol in the current image, wherein said means for inserting performs the insertion for one image out of every two, wherein the means for determining a modulation sequence comprises:

means for performing integer division of the value of a predetermined component of each pixel of the reference image, by a first predetermined value, means for comparing the remainder of the integer division with a second predetermined value, for each integer division, and means for determining the value of each coefficient of the modulation sequence, depending on the respective result of each comparison.

37. A device according to claim 36, wherein the predetermined component is the luminance.

38. An extraction device according to claim 36, wherein the means for, determining, modulating, and inserting are incorporated in:

a microprocessor, a read only memory, comprising a program for processing the data, and a random access memory comprising registers adapted to record variables modified during the execution of said program.

39. A device for the insertion of a message in a sequence of images, the message comprising ordered symbols, said device comprising:

means for determining, for each image in which a symbol of the message is to be inserted, a first modulation sequence from a reference image included in the sequence of images, according to a first law, if the order of the symbol is different than a predetermined order, means for determining a second modulation sequence from a reference image included in the sequence of images, according to a second law, if the order of the symbol is equal to the predetermined order, wherein the second modulation sequence determined according to the second law is different from the first modulation sequence determined according to the first law, means for modulating the symbol to be inserted by the determined modulation sequence, and means for inserting the modulated symbol in the current image.

40. A device according to claim 39, wherein the means for determining the first modulation sequence and the means for determining the second modulation sequence are adapted to determine them such that the result of the correlation of the first sequence by the second sequence is negligible in relation to the result of the correlation of the first sequence by itself or of the second sequence by itself.

41. A device according to claim 39, wherein the means for determining the first modulation sequence and the means for determining the second modulation sequence are adapted to consider a reference image which is the image following the current image in the sequence.

42. A device according to claim 39, wherein the insertion means is adapted to perform the insertion in one image out of every two.

43. A device according to claim 39, wherein the means for determining a modulation sequence comprises:

means for performing integer division of a quantity dependent on the value of a predetermined component of each pixel of the reference image, by a first predetermined value, means for comparing the remainder of the integer division with a second predetermined value, for each integer division, and means for determining the value of each coefficient of the modulation sequence, depending on the respective result of each comparison.

44. A device according to claim 43, wherein the predetermined component is the luminance.

45. A device according to claim 39, wherein the determination means is adapted to consider a predetermined order which is that of the first symbol of the message.

46. A device for extracting a message from a sequence of images in which the message has been inserted by the device according to claim 39, comprising:

means for detecting the images in which the symbol of predetermined order has been inserted, among the images in which a message symbol has been inserted, and means for extracting the inserted message.

47. A device for extraction according to claim 46, further comprising means for detecting the images in which a message symbol has been inserted.

48. A device for extraction according to claim 47, wherein the means for detecting the images in which a symbol has been inserted comprises:

means for estimating, for an image, the watermarking signal of the inserted symbol, means for determining a demodulation sequence from a reference image, according to the first law, means for measuring a correlation between the estimated watermarking signal and the demodulation sequence, and means for determining the images for which the correlation measurement is maximum.

49. A device for extraction according to claim 46, wherein the means for detecting the images in which the symbol of predetermined order has been inserted comprises:

means for estimating, for an image in which a symbol has been inserted, the watermarking signal of the inserted symbol, means for determining a demodulation sequence from a reference image, according to the second law, means for measuring a correlation between the estimated watermarking signal and the demodulation sequence, and means for determining the images for which the correlation measurement is maximum.

50. An extraction device according to claim 46, further comprising:

means for estimating, for an image in which a symbol has been inserted, the watermarking signal of the inserted symbol, means for determining a demodulation sequence from a reference image, according to a first or second law, depending on the order of the symbol, and means for demodulating the estimated watermarking signal with the demodulation sequence.

51. An extraction device according to claim 46, wherein the means for detection and extraction are incorporated in:

a microprocessor, a read only memory, comprising a program for processing the data, and a random access memory comprising registers adapted to record variables modified during the execution of said program.

52. An insertion device according to claim 39, wherein the means for determining, modulating and instructing are incorporated in:

a microprocessor, a read only memory, comprising a program for processing the data, and a random access memory comprising registers adapted to record variables modified during the execution of said program.

53. A device for the insertion of a message in a sequence of images, the images comprising pixels represented by components, comprising:

means for determining, for each image in which a symbol of the message is to be inserted, a modulation sequence from a reference image included in the sequence of images, according to a periodic law of predetermined period, said law being such that, if a correlation were measured between the modulation sequence and a second modulation sequence determined according to the same law and from the same reference image, in which the values of a predetermined component of the pixels have been modified, and if the absolute values of the measured correlation values were plotted on a graph, the graph would have only one maximum value over the predetermined period, means for modulating the symbol to be inserted by the determined modulation sequence, and means for inserting the modulated symbol in the current image.

54. A device according to claim 53, wherein the reference image is the image following the current image in the sequence.

55. A device according to claim 53, wherein the insertion means is adapted to perform the insertion in one image out of every two.

56. A device according to claim 53, wherein the means for determining a modulation sequence comprises:
- means for performing integer division of the value of the predetermined component of each pixel of the reference image, by a first predetermined value,
- means for comparing the remainder of the integer division with a set of second predetermined values, for each integer division, and
- means for determining the value of each coefficient of the modulation sequence, depending on the respective result of each comparison.

57. A device according to claim 53, wherein the predetermined component is the luminance.

58. A device for extracting a message from a sequence of images in which the message has been inserted by the device according to claim 53, comprising:
- means for estimating a modification of the values of the predetermined component of the pixels of the reference image, for each image in which a symbol has been inserted,
- means for compensating for the estimated modification, for each image in which a symbol has been inserted, and
- means for extracting the inserted message.

59. An extraction device according to claim 58, wherein the means for estimating a modification of the values of the predetermined component of the pixels of the reference image comprises:
- means for estimating the watermarking signal of the inserted symbol,
- means for determining a demodulation sequence from a reference image in which the value of the predetermined component of the pixels have been modified,
- means for measuring a correlation between the estimated watermarking signal and the demodulation sequence, and
- means for determining a modification value for which the correlation measurement is maximum.

60. An extraction device according to claim 58, wherein the compensation means comprises means for adding the estimated modification to the value of the predetermined component of each pixel of the reference image.

61. An extraction device according to claim 58, wherein the extraction means comprises:
- means for estimating, for an image in which a symbol has been inserted, the watermarking signal of the inserted symbol,
- means for determining a demodulation sequence from a reference image, in which the values of the predetermined component of the pixels has been modified by the estimated modification, and
- means for demodulating the estimated watermarking signal with the demodulation sequence.

62. An extraction device according to claim 58, wherein the means for estimating, compensating and extracting are incorporated in:
- a microprocessor,
- a read only memory, comprising a program for processing the data, and
- a random access memory comprising registers adapted to record variables modified during the execution of said program.

63. An insertion device according to claim 53, wherein the means for determining, modulating and inserting are incorporated in:
- a microprocessor,
- a read only memory, comprising a program for processing the data, and
- a random access memory comprising registers adapted to record variables modified during the execution of said program.

* * * * *

UNITED STATES PATENT AND TRADEMARK OFFICE
CERTIFICATE OF CORRECTION

PATENT NO. : 7,386,146 B2
APPLICATION NO. : 10/235803
DATED : June 10, 2008
INVENTOR(S) : Hervé Le Floch It is certified that error appears in the above-identified patent and that said Letters Patent is hereby corrected as shown below:

Col. 5, line 48, "is" should read --it--.

Col. 6, line 31, "is" should read --it--.

Col. 9, line 50, "is" should read --it--.

Col. 18, line 4, "$\vec{v}^-(p,q)=(v_p^-(p,q),v_q^-(p,q))$" should read

-- $\vec{v}^-(p,q)=(v_p^-(p,q),v_q^-(p,q))$ --.

Col. 34, line 67, "image." should read --image,--.

Col. 38, line 53, "for," should read --for--.

Signed and Sealed this

Tenth Day of February, 2009

JOHN DOLL
*Acting Director of the United States Patent and Trademark Office*